(12) United States Patent
Fisher et al.

(10) Patent No.: US 9,779,457 B1
(45) Date of Patent: Oct. 3, 2017

(54) PERSONALIZED NAVIGATION CONTROL ITEMS FOR AN APPLICATION

(71) Applicant: United Services Automobile Association (USAA), San Antonio, TX (US)

(72) Inventors: Jeremy Fisher, San Antonio, TX (US); Joshua Goforth, San Antonio, TX (US)

(73) Assignee: United Services Automobile Association (USAA), San Antonio, TX (US)

( * ) Notice: Subject to any disclaimer, the term of this patent is extended or adjusted under 35 U.S.C. 154(b) by 290 days.

(21) Appl. No.: 13/795,621

(22) Filed: Mar. 12, 2013

Related U.S. Application Data

(60) Provisional application No. 61/611,482, filed on Mar. 15, 2012.

(51) Int. Cl.
  *G06Q 40/06* (2012.01)
  *G06Q 40/02* (2012.01)
  *G06F 3/0484* (2013.01)

(52) U.S. Cl.
  CPC ......... *G06Q 40/06* (2013.01); *G06F 3/04842* (2013.01); *G06Q 40/02* (2013.01)

(58) Field of Classification Search
  CPC .................................................. G06Q 40/06
  See application file for complete search history.

(56) References Cited

U.S. PATENT DOCUMENTS

| | | | |
|---|---|---|---|
| 6,256,633 B1 | 7/2001 | Dharap | |
| 7,171,384 B1 | 1/2007 | Fitzpatrick et al. | |
| 7,774,230 B2 | 8/2010 | Libman | |
| 7,813,983 B2 | 10/2010 | Wottowa et al. | |
| 8,015,606 B1 | 9/2011 | Jevans et al. | |
| 8,032,453 B2 | 10/2011 | Ahuja et al. | |
| 8,271,379 B1 | 9/2012 | Watson | |

(Continued)

OTHER PUBLICATIONS thinkDesktop User Manual last updated: Dec. 17, 2009 www.thinkorswim.com/learningcenter.*

(Continued)

*Primary Examiner* — William Bashore
*Assistant Examiner* — Nathan Shrewsbury
(74) *Attorney, Agent, or Firm* — Fish & Richardson P.C.

(57) ABSTRACT

Embodiments of the present invention provide methods, systems, and computer-readable storage medium for providing personalized navigation control items of an application. In an embodiment, a method includes receiving, from a user, at least one identification element of the user on a page of the application via a mobile computing device. The method includes transmitting, to a financial institution system, the user's identification element. Upon authenticating the user by the financial institution system, the method further includes receiving, at the mobile computing device, information related to personalization of navigation control items associated with a plurality of service sections of the application. The personalization of the navigation control items are generated by applying business rules to user data by the financial institution system. The navigation control items that personalized for the user's convenience and need are displayed on a page of the application on the mobile computing device.

20 Claims, 29 Drawing Sheets

(56) References Cited

U.S. PATENT DOCUMENTS

| | | |
|---|---|---|
| 8,386,561 B2 | 2/2013 | Artz et al. |
| 8,548,909 B1 | 10/2013 | Snow |
| 8,566,187 B2 * | 10/2013 | Keld et al. ................. 705/30 |
| 8,566,203 B1 | 10/2013 | Vieira et al. |
| 8,566,718 B1 | 10/2013 | O'Neill et al. |
| 8,856,958 B1 | 10/2014 | Kosslyn et al. |
| 2002/0091937 A1 | 7/2002 | Ortiz et al. |
| 2003/0050976 A1 | 3/2003 | Block et al. |
| 2005/0257156 A1* | 11/2005 | Jeske ............... H04L 67/36 715/745 |
| 2006/0015387 A1 | 1/2006 | Moore |
| 2007/0027895 A1 | 2/2007 | Bridges et al. |
| 2007/0167151 A1 | 7/2007 | Zinn et al. |
| 2007/0245407 A1 | 10/2007 | Lester et al. |
| 2008/0086508 A1 | 4/2008 | Ballew |
| 2008/0186871 A1 | 8/2008 | Trevino et al. |
| 2008/0234051 A1* | 9/2008 | McNutt ............. G07F 17/32 463/42 |
| 2009/0193514 A1 | 7/2009 | Adams et al. |
| 2009/0281959 A1* | 11/2009 | Abidi et al. ............ 705/36 R |
| 2010/0004957 A1* | 1/2010 | Ball .......................... 705/4 |
| 2011/0028138 A1* | 2/2011 | Davies-Moore et al. .... 455/418 |
| 2011/0093790 A1 | 4/2011 | Maczuba |
| 2011/0107265 A1* | 5/2011 | Buchanan et al. ............ 715/835 |
| 2012/0110087 A1 | 5/2012 | Culver |
| 2012/0124651 A1 | 5/2012 | Ganesan |
| 2012/0240060 A1 | 9/2012 | Pennington et al. |
| 2012/0246044 A1* | 9/2012 | Fox et al. ................. 705/35 |
| 2012/0259647 A1 | 10/2012 | Syed et al. |
| 2012/0295580 A1 | 11/2012 | Corner |
| 2012/0310764 A1 | 12/2012 | Sinsheimer et al. |
| 2014/0274107 A1* | 9/2014 | Rados ..................... 455/456.1 |

OTHER PUBLICATIONS

ThinkDesktop User Manual last updated: Dec. 17, 2009, www.thinkorswim.com/learningcenter, 54 pages.

* cited by examiner

PERSONALIZED NAVIGATION CONTROL ITEMS FOR AN APPLICATION

CROSS-REFERENCES TO RELATED APPLICATIONS

This application claims priority to U.S. Provisional Patent Application No. 61/611,482, filed Mar. 15, 2012, entitled "Personalized Navigation Control Items for an Application," the disclosure of which is hereby incorporated by reference in its entirety for all purposes. This application is related by subject matter to the following applications: U.S. Provisional Patent Application No. 61/611,474 and U.S. Provisional Patent Application No. 61/611,479, both filed on Mar. 15, 2012. This application is also related by subject matter to the following applications: U.S. patent application Ser. No. 13/795,558 and U.S. patent application Ser. No. 13/795,576, both filed on Mar. 12, 2013. The entire contents of the aforementioned applications are hereby incorporated by reference in their entirety.

BACKGROUND OF THE INVENTION

Customers demand more of the products and services they use than ever before. They insist that the companies they deal with on a regular basis provide them greater and greater levels of accuracy and more tailored service offerings. Companies configure and operate ever increasing numbers of computer systems to achieve this. Using sources of information that have traditionally been unavailable when servicing these customers are now expected.

SUMMARY OF THE INVENTION

The present invention generally relates to personalizing navigation control of an application for a customer for navigating and accessing the customer's accounts at a financial institution system. More specifically, the present invention relates to methods and systems for simplifying a customer's experience by providing an application with automatically personalized navigation control items (e.g., tabs in a tab bar) for the customer. When the customer logs into the application, the customer receives a custom set of navigation control items that are selected and sorted based on business intelligence about the customer. For example, navigation control items associated with products or services owned or frequently used by the customer are placed at visually prominent positions in a menu bar compared to other navigation control items. The methods and techniques in accordance with the present invention can be applied to a variety of business, financial, and insurance systems that provide a wide array of products and services for customers.

According to an embodiment of the present invention, a method performed by a processor of a mobile computing device provides personalized navigation control for an application. The method includes providing a processor and a memory operatively coupled to the processor in the mobile computing device. The method also includes receiving, from a user, at least one identification element of the user on a page of the application via the mobile computing device. Upon authenticating the user by a financial institution system, the method includes receiving, at the mobile computing device, information related to personalization of navigation control items associated with a plurality of primary service sections of the application. The personalization of the navigation control items are generated by applying business rules to user data by the financial institution system. The method further includes displaying, on a page of the application, personalized navigation control items for the user according to the information received from the financial institution system.

According to another embodiment of the present invention, a method performed by a processor of a server computer of a financial institution system provides information related to personalization of navigation control for an application. The method includes providing a server computer for the financial institution system, having a processor and a memory operatively coupled to the processor. The method includes receiving, at the financial institution system via an application on a mobile computing device, at least one identification element associated with a user. The method also includes authenticating the user by comparing the at least one identification element with the user's credentials stored in a database of the financial institution system. The method further includes analyzing, using business rules and the processor, user data including the user's business relationship with respect to each of primary service sections of the financial institution system. The method further includes determining, using the processor, personalization of navigation control items for navigating the primary service sections on a page of the application. The navigation control items are personalized according to an analysis of the user data using the business rules. The method further includes transmitting information related to personalization of the navigation control items to the mobile computing device.

According to another embodiment of the present invention, a system is provided wherein the system comprises a processor and a computer storage medium including a plurality of computer-readable instructions tangibly embodied on the computer-readable storage medium. The plurality of computer-readable instructions, which, when executed by a data processor, provide methods described in the present application.

According to another embodiment of the present invention, a computer-readable storage medium is provided. The computer-readable storage medium includes a plurality of computer-readable instructions tangibly embodied on the computer-readable storage medium. The plurality of computer-readable instructions, which, when executed by a data processor, provide methods described in the present application.

Numerous benefits are achieved by way of the present invention over conventional techniques. Conventionally, a default set of navigation control items are provided for all customers regardless of the customers' business relationship (e.g., account types or status owned by the customers) with a financial institution system. In embodiments of the present invention, the financial institution system utilizes business intelligence about its customers and personalized information architecture to provide personalized navigation control of the application for the customers. The personalized information architecture provides a foundation for delivering an exceptional, personal experience for the customer in using the application. The navigation control items on a page of the application in accordance with the present invention can be adapted optimally to meet each customer's unique set of needs. The architectural extensibility of the application ensures for future growth and innovation, while maintaining control and efficiency for customers' everyday use of the application. These and other embodiments of the invention along with many of its advantages and features are described in more detail in conjunction with the text below and attached figures.

BRIEF DESCRIPTION OF THE DRAWINGS

FIG. 5F illustrates screenshots that illustrate a personalized information architecture before and after an update of personalization of navigation control items;

DETAILED DESCRIPTION OF SPECIFIC EMBODIMENTS

Figure 1A:
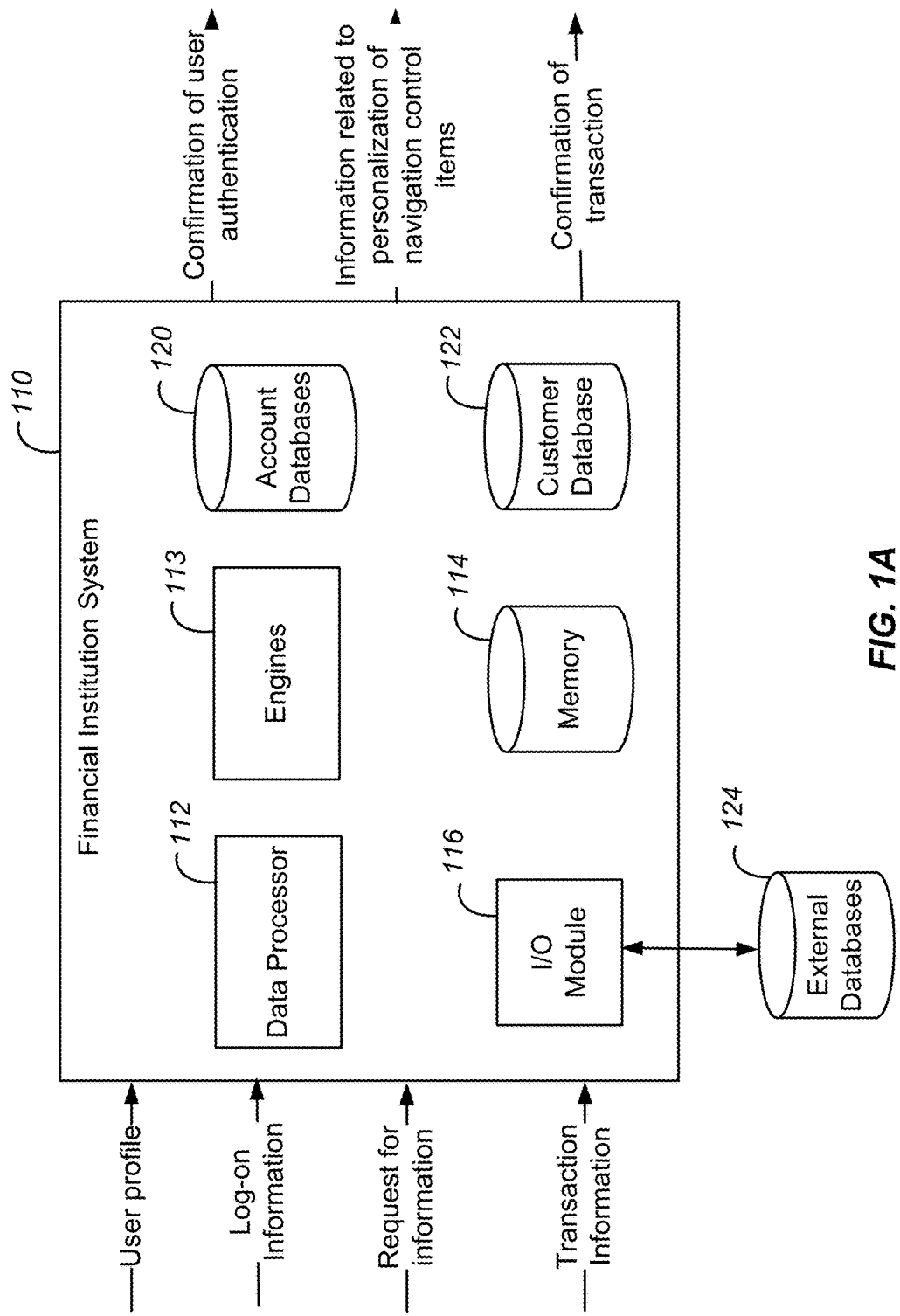
FIG. 1A is a high level schematic diagram illustrating a financial institution system according to an embodiment of the present invention.

A large institution, such as a financial institution, offers a wide array of products and services. For example, a financial institution may be a diverse, complex organization that includes many business sections, such as banking, insurance, investments, or the like. Thus, bringing all the diverse aspects and business of a financial institution into a single application (or a website) in a unified fashion may create immense complexity in the user interfaces being delivered by the financial institution. When a financial institution structures these products and services into information architecture (IA) for a digital channel, the result can sometimes be overwhelming to its customers. One type of user interface and navigation features may not be ideally configured for all customers. Some websites allow users to customize and configure navigation features. However, only a few customers take advantages of these self-customization features due to lack of interest or time.

In embodiments of the present invention, the user interfaces for the digital channels for mobile computing devices can be prioritized, organized, and personalized automatically by a server computer for the customer according to business intelligence about the customer. Embodiments of the present invention utilize personalized information architecture that adapts optimally to meet each customer's unique set of needs. An application in accordance with embodiments of the present invention simplifies a customer's experience by creating a personalized navigation control or menu bar and remembering the customer's personalized navigation control settings across all application sessions.

As an illustration, each customer who logs onto an application in accordance with the present invention receives a personalized set of navigation control items, such as tabs featured in a tab bar. For the first time user of the application, the navigation control items are selected and sorted based on business intelligence about the customer by identifying products owned and services utilized by the customer, followed by a needs-based targeting to personalize the navigation control items. The business intelligence may include analyzing the customer's ownership of account types (e.g., banking, insurance, investments, or the like), the customer's frequency of use of various services, account balances for different services at the financial institution, or the like. Based on the customer's business relationship, the financial institution system can custom populate and reorder navigation menu and options so that the navigation control items are personalized and tailored for each customer.

As an example, if a customer has only an automobile insurance policy with a financial institution, then the navigation control item associated with insurance may be placed at the most visually prominent place (e.g., left hand side of a tab bar). In another example, if a customer has investment accounts but not any insurance accounts, then a navigation control item associated with investments may be placed at the most visually prominent place in the tab bar. Using business rules, the financial institution system can determine how to populate the rest of the tab or menu according to the customer's business relationship and needs.

The configuration of navigation control items (e.g., tab configuration) can be synchronized with the financial institution server computers, ensuring that the customer's experiences can remain consistent across multiple client devices. Furthermore, the configuration of navigation control items can be stored in a server computer so that the configuration can be recovered during a re-installation of the application. Additionally, local cache of the navigation control item arrangement (e.g., tab bar arrangement) can be stored in the application for a subsequent application launch, optimizing the customer's experience for frequent use of the application. An application according to the present invention ensures architectural extensibility for future growth and innovation, while maintaining control and efficiency for customers' everyday use of the application.

As described more fully throughout the present specification, embodiments of the present invention provide technologies to provide a customer with an application with navigation control items that are personalized for the customer. Additional description related to these embodiments is provided throughout the present specification and more particularly below.

FIG. 1A is a high level block diagram illustrating a financial institution system 110. The financial institution system 110 utilizes inputs received from the user and processes the received inputs to provide various outputs including information related to personalization of navigation control items for an application. In embodiments of the present invention, the financial institution system may be operated by a financial services company, which may offer a number of different services, including banking, insurance, investment, credit card, or the like. While FIG. 1A illustrates a financial institution system as an example, the system 110 can be utilized by any type of entity or business that has diverse business sectors and wish to provide user interfaces that can be prioritized and personalized based on business intelligence about the user.

As illustrated in FIG. 1A, multiple inputs can be received from the user. The inputs may include information related to a user profile—whether the user is a current customer or a prospect (whose identity is unknown). Alternatively, the user may indicate that the user wants to register and become a customer. The received inputs may also include log-on information from the current customer to obtain a secured access to the financial institution system via the application on the mobile computing device. The user may seek access to the financial institution system 110 to obtain information, such as account information, products, or services. For example, the user may seek access to the financial institution through a selection of a navigation control item on a page of the application on a mobile computing device. The financial institution system can also receive transaction information related to the user's accounts (e.g., paying bills, deposit, transfer of funds, or the like). Although four inputs are illustrated in FIG. 1A, embodiments of the present invention are not limited to these particular inputs, and other inputs are within the scope of the present invention.

Once information and/or requests from the user are received by the financial institution system, a data processor 112 and engines 113 (e.g., authentication engine, user interface engine, financial engine, business rules engine, or the like) interact with a number of different databases (e.g., account databases 120 and customer database 122) to perform various analyses. In an embodiment, using information related to the user's business relationship with the financial institution, personalization of navigation control items for an application can be determined for the user's convenience. For example, if the user accesses banking accounts more frequently than insurance accounts, then personalization of navigation control items may include placing a navigation control item associated with banking services at a more visually prominent place in a tab bar on a page of the application than a navigation control item associated with insurance services. While the financial institution system 110 can also include other databases, engines, systems, subsystems, or the like, these other components are not illustrated in FIG. 1A.

As illustrated in FIG. 1A, multiple outputs can be provided for the user by the financial institution system 110. For example, confirmation of user authentication can be provided as an output. Also, information related to personalization of navigation control items for an application can be provided as an output. Furthermore, confirmation of requested transactions (e.g., paying bills, transferring money between accounts, or the like) can be provided as an output. Although three outputs are illustrated, embodiments of the present invention are not limited to these particular outputs, and other outputs are within the scope of the present invention.

Figure 1B:
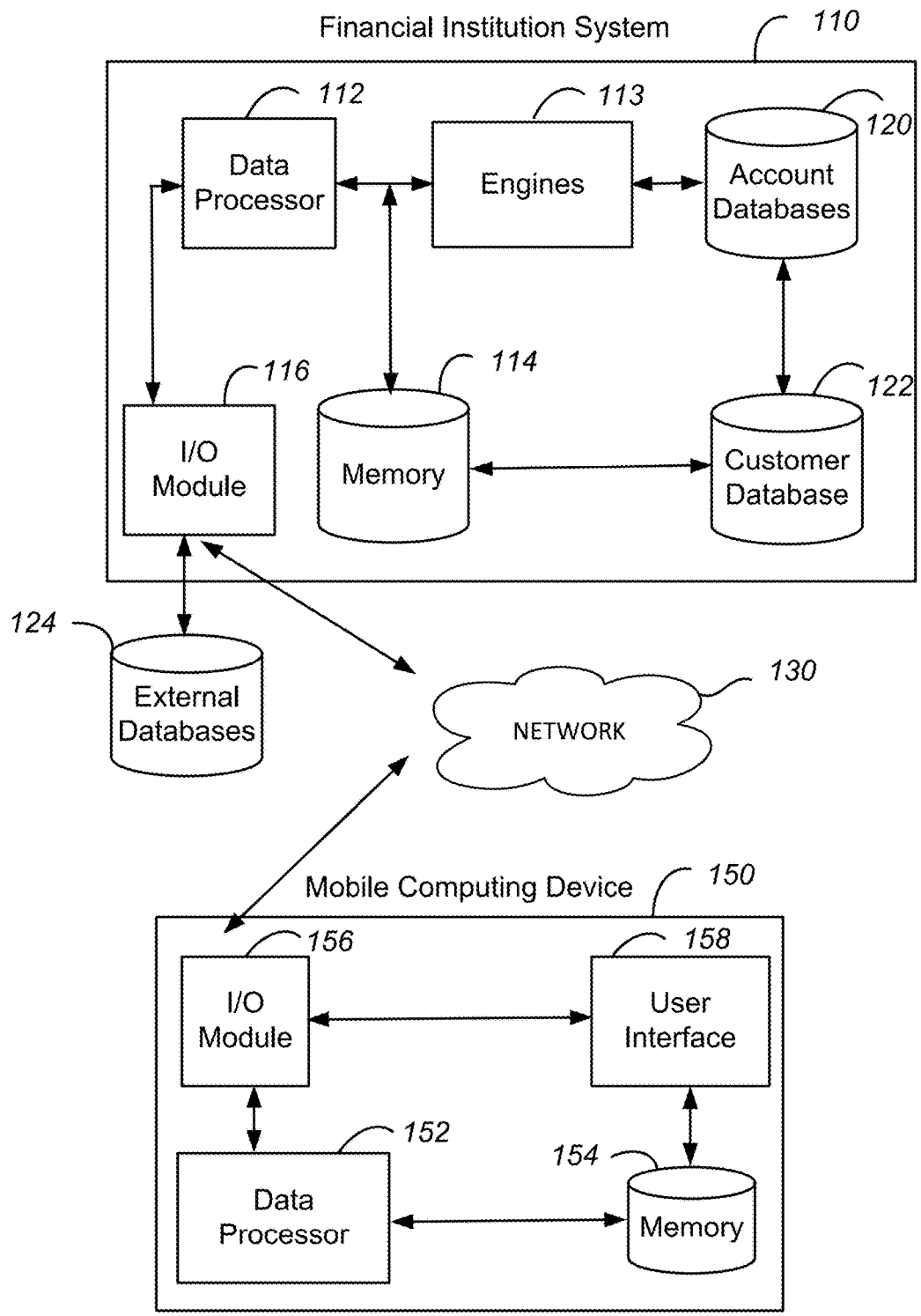
FIG. 1B is a high level schematic diagram illustrating an interaction of a financial institution system with a user according to an embodiment of the present invention.

FIG. 1B is a high level schematic diagram illustrating an interaction of a financial institution system with a user according to an embodiment of the present invention. As illustrated in FIG. 1B, a user operating a mobile computing device 150 interacts with the financial institution system 110 through network 130. The mobile computing device 150 can include any suitable type of mobile computing device. For example, mobile computing device 150 may include a portable electronic device that the user may hold in his or her hand, such as a digital media player (e.g., an iPod™), a personal data assistant ("PDA"), a cellular phone (iPhone™, Android™ phone, Blackberry™, or other smartphones), a tablet computer (e.g., iPad™, Android™ tablets, or the like). While FIG. 1B illustrates a mobile computing device 150 as an example, other electronic device that is substantially fixed, such as a desktop computer, may be used as a client device to interact with financial institution system 110.

Figure 6:
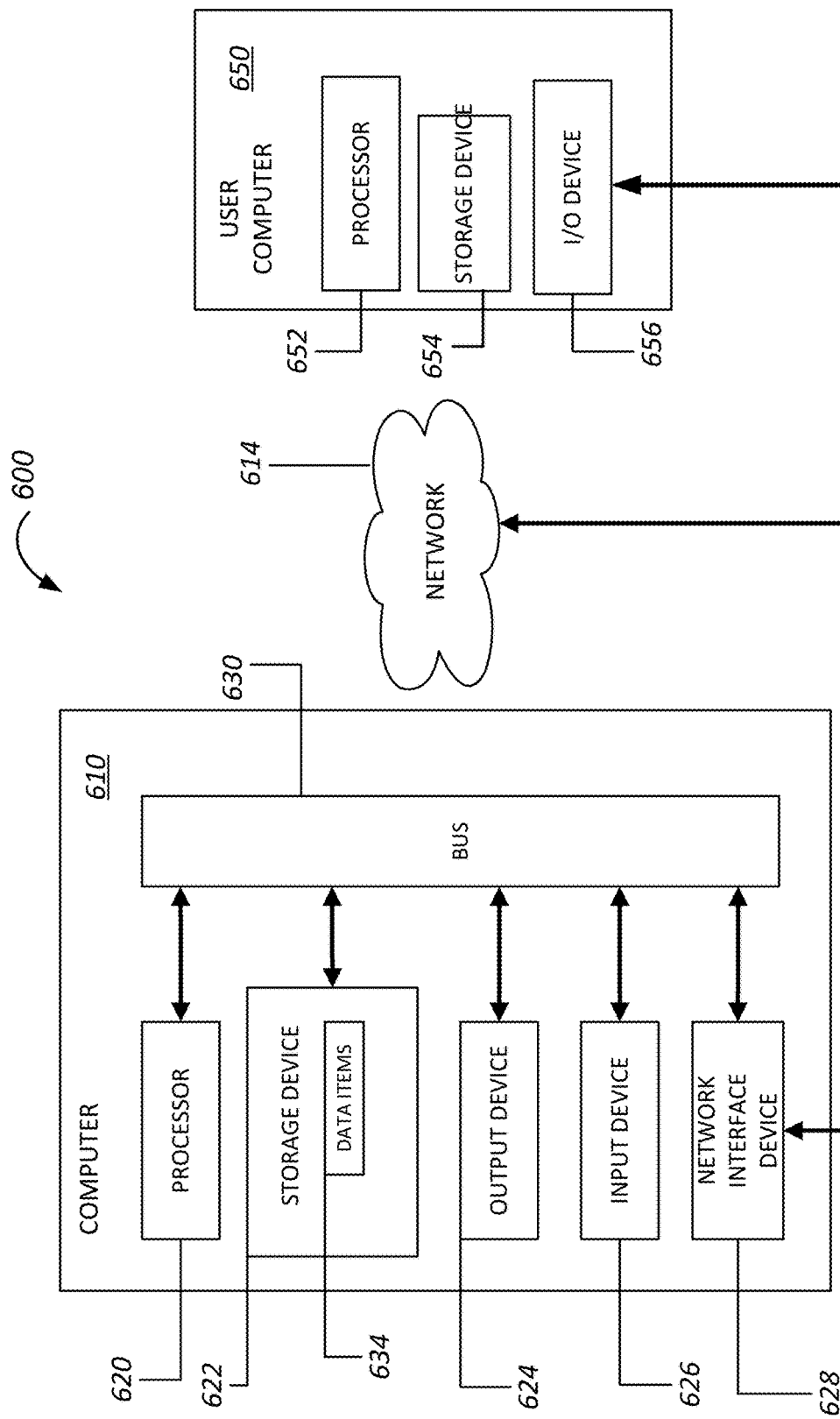
FIG. 6 is a high level schematic diagram illustrating a computer system including instructions to perform any one or more of the methodologies described herein.

As shown in FIG. 1B, the financial institution system 110 includes a data processor 112, also referred to as a processor, and a memory 114. The description provided in relation to processors and memory in FIG. 6 is also applicable to the data processor 112 and memory 114. An input/output module 116 (also referred to as a communications module) is provided to enable communications between the financial institution system and external users, computers, and mobile computing devices.

The financial institution system 110 also includes account databases 120, external database 124, and a customer database 122. The financial institution system 110 is communicatively coupled, in one example, to an external database 124, which may include additional customer, merchant, or financial services information. The account databases 120, in contrast with the external database 124, are maintained by the company operating the financial institution system 110, typically by a financial services company such as the present assignee. As described more fully throughout the present specification, the I/O module 116, the data processor 112, memory 114, account databases 120, and customer database 122 can be utilized to receive inputs from the user mobile computing device 150 and transmit requested information and information related to personalization of navigation control items for an application to the user device.

The customer database 122 stores data on customers/members of an organization, which may include both existing customers and/or potential customers of a financial services company. In embodiments of the present invention, the term "member" is used instead of "customer." The use of the term "member" is not intended to limit the scope of the present invention but merely to provide an example of a customer who may be benefited by embodiments of the present invention. In this sense, the use of the term member is intended to cover the term customer. In embodiments of the present invention, any discussions related to a member in this application also apply to a customer, and vice versa.

The data on the member/customer stored in the customer database 122 may include a customer's name, address, date of birth, Social Security number, credit history, and other demographic information, information regarding financial accounts held by the customer, information regarding the customer's transaction history, or the like. In some embodiments, the members' identification elements, such as a user name, passwords, PINs, biometrics, or other credentials may be also stored in the customer database 122 or in another database not shown in FIG. 1B.

The financial institution system 110 also includes engines 113. The engines 113 may be a single engine or a collection of engines performing different functions. For example, the engines 113 may include a financial services engine, an authentication engine, a user interface engine, and a business rules engine. The financial services engine and data processor 112 interact with account databases 120 to process financial data of the user. The financial services engine may, for example, transfer money between accounts of the user or pay bills according to instructions received from the user.

The authentication engine can analyze and process personal credential data from the user and user devices. The personal credential data received from the user can be compared with credentials previously stored in a database, such as user names, passwords, secret phrases, personal identification numbers (PINs), biometrics, or other credentials. The authentication engine may use the personal credential data to authenticate the user to permit access to contents associated with the financial institution system via network 130 through the mobile computing device.

In some embodiments, a part of the authentication process can be run by the client device (e.g., a mobile computing device). The user's credential information may be stored in the memory of the client device. Upon receiving an input from the user, the user may be authenticated locally by comparing the user input against the credential information retrieved from the local memory.

The user interface engine of the financial institution system may generate and format one or more pages of content (e.g., display views) as a unified graphical presentation that may be provided to one or more of the user devices, including the mobile computing device 150, as an output from the financial institution system 110. The pages of content may be provided to the mobile computing device 150 via an application downloaded on, or otherwise configured with, the mobile computing device 150 or via a website associated with the financial institution. The pages of content may be provided to mobile computing devices as well as other user devices of the user, such as a desktop computer, depending on the implementation. In some embodiments, pages of content may be generated and stored locally in the client device when the application is executed in the client device.

Upon authenticating the user identity and/or user profile, the user interface engine may generate and format pages of content according to the user identity and user profile. For example, if the financial institution system receives a request for banking information (via the user selection of a banking tab on a mobile application), pages of content generated for a current customer may include information related to the customer's bank accounts. By contrast, if the request is received from a prospect, the generated pages of content may include marketing information related to banking products or services. One or more pages of contents generated by the user interface engine are then transmitted to the user mobile computing device.

The business rules engine of the financial institution system can apply business rules to user data (e.g., financial, personal, and other data of the user) to custom tailor navigation control items and personalize them on a graphical user interface for the user. The business rules may be dynamic as the financial institution may also change or update the rules applied by the business rules engine. The changes in the user's financial, personal, or other data may also trigger the application of business rules that did not previously apply.

In an embodiment of the present invention, the business rules depend on many factors, including types of accounts owned by the user, values of accounts, and frequency of the user's access to each account, or the like. As an example, if the user has only banking accounts, then a navigation control item for banking services may be displayed at the most prominent place on a page of the application (e.g., at the top of a menu). In another example, if it is determined that the user accesses the user's investment accounts more frequently than banking or insurance accounts, then a navigation control item for investments services may be displayed more prominently than the banking or insurance navigation control items.

In some embodiments, behavioral data can be aggregated to contribute to the business rules (e.g., "members with characteristics like this member are most likely to need the following . . . "). Additionally, business-determined priority might also be utilized as a factor.

A user operating the mobile computing device 150 interacts with the financial institution system 110 through network 130, which may be the Internet. In some embodiments, the network 130 is partly or wholly a private wide area network, local area network, or the like.

In FIG. 1B, the mobile computing device 150 may have installed on it, or otherwise configured, with an application for navigating and accessing main features or services provided by the financial institution. For example, a user can request to transfer money between accounts using user interface 158, which results in data transfer through I/O module 156 and network 130. The information from the user, for example, a request for transfer of funds, can be used by the financial institution system 110 to determine if the transfer should be approved. The mobile computing device 150 can receive responses such as requests to update information from the financial institution system 110, process the received information using data processor 152, store the received and/or processed information using memory 154, and display the processed/stored information using the user interface 158, which may be touch-screen enabled.

While FIG. 1B illustrates the mobile computing device 150 interacting with the financial institution system 110, any user computing device, such as a desktop computer, may interact with the financial institution system in the manner described in the present application. Many features described in relation to an application for a mobile computing device are applicable to websites for a mobile computing device or a desktop computer.

Figure 2A:
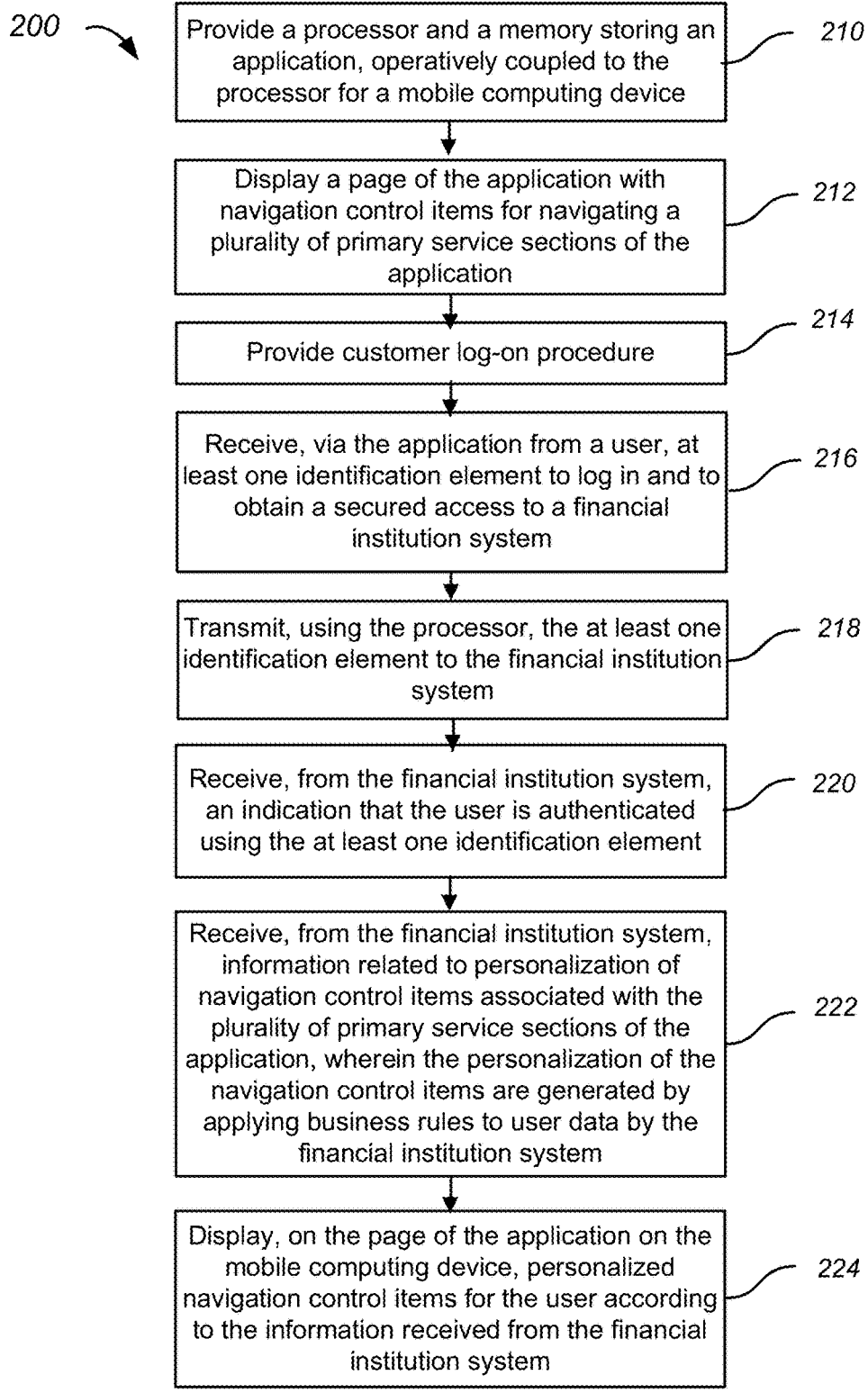
FIG. 2A is a high level flowchart illustrating a method of providing personalized navigation control items for an application according to an embodiment of the present invention.

FIG. 2A is a high level flowchart illustrating a method performed by a mobile computing device. In the embodiment illustrated in FIG. 2A, the method 200 is used to provide personalized navigation control items for a user on a page of an application for a mobile computing device. The personalized navigation control items are prioritized and organized according to business rules and the user's business relationship with a financial institution. In one embodiment, navigation control items that have higher priority values for the user are displayed at more visually prominent positions on a page of the application than navigation control items that have lower priority values.

In FIG. 2A, the method 200 includes providing a processor and a memory, operatively coupled to the processor for the mobile computing device (210). The mobile computing device may have installed on it, or otherwise configured with, an application to assist a user to navigate and access the user's accounts held at a financial institution. For example, an application according to embodiments of the present invention may be downloaded from a financial institution system or third party sites and is stored in the memory of the mobile computing device. In another embodiment, the application can reside on a financial institution system (e.g., a server computer) or a third party computer and can be accessed via network, and parts of the application may be downloaded to the mobile computing device for local processing each time it is used.

In an embodiment of the present invention, when the application is launched by a user first the first time on the user's mobile computing device, the application can display a launch page with a default set of navigation control items for navigating a plurality primary service sections of the application (212). In embodiments of the present invention, the navigation control items can be any type of user interface element that allows a user to navigate different parts of the application. For example, the navigation control items can be in the form of icons, buttons, or tabs on a page of the application that allows the user to navigate different primary service sections of the application (at the top tier or first level of the application architecture) or any main features of services provided by the financial institution. The navigation control items can be of any suitable size or shape. They can include text, symbols, and/or other graphical representations that allow the user to recognize that tapping a given navigation control item on a touch-screen user interface can bring a view related to a particular primary service section of the financial institution system.

The "primary" service sections of the application can refer to sections at the top tier of the application architecture that allow a user to interact with core services of the financial institution or to perform common tasks in utilizing the core services. For example, the core services or business provided by a financial institution can include banking, insurance, investments, or the like. The common tasks that are performed by a user in utilizing the core services can include bill paying, depositing money, transferring money, viewing a summary of all accounts, or the like. These common tasks are performed in high-volume, at high-frequency by a user, and they are placed at the top tier of the application architecture together with the core services of the financial institution. In some embodiments, member services related to automobile, home, retirement, or the like may be also included at the top tier of the application architecture.

In an embodiment of the present invention, each navigation control item on a page of the application can be labeled and associated with each of the primary service sections of the financial institution. For example, each navigation control item can be labeled and associated with primary service sections, such as "insurance," "banking," "investment," "pay bills," "transfer/deposit," "all accounts," or the like. The navigation control items may be organized in a tab bar or in any other suitable format (e.g., a menu) and displayed on one or more pages of the application. In one embodiment, the navigation control items are grouped together in a tab or menu bar and displayed at a visually prominent place (e.g., at the bottom) on a page of the application. In another embodiment, the navigation control items associated with the primary service sections are displayed in a tab bar on all pages of the application. This allows the user to readily navigate to any primary service section at the top tier of the application architecture from any page of the application.

Referring to FIG. 2A, the method includes providing an input screen to receive the user's profile and/or log-on information (214). For example, a welcome screen may be used to request a user to identify a user profile as follows:

1. I'm a current customer—I'd like to log on;
2. I'd like to become a customer; and
3. I'm not a current customer—I'd like to browse.

If the user's selection from one of the options indicates that the user is an existing customer, a customer log-in screen is displayed. If the user's selection indicates that the user wants to become a customer, then a different set of input screens may be provided for the user. If the user's selection indicates that the user is not a current customer (i.e., a prospect) and wants to browse the application, then the user may be profiled as a prospect, and contents for prospects may be provided to the user through the application.

In embodiments of the present invention, the use of a welcome screen is one example of receiving the user's log-on information (i.e., identification elements associated with the user). Instead of using a welcome screen to determine a user profile and to receive log-on information, a separate log-on icon can be provided in one or more pages of the application. This allows the user to browse various features of the application as a prospect before logging in to obtain a secured access to the financial institution system to view private and sensitive data, such as the user's financial data (e.g., banking, insurance, investments, or the like).

As shown in FIG. 2A, the method 200 also includes receiving, from the user, at least one identification element of the user on a page of the application (216). The identification elements (e.g., log-on information) can include information such as a user ID, a password, PINs, biometrics, or other credentials used to authenticate the user. In an embodiment, the identification elements received from the user is transmitted to a financial institution system (218). The authentication procedures can also involve the use of digital certificates or a security key.

Upon receiving the user's identification elements, the authentication engine of the financial institution may retrieve the user's credential information stored in the customer database 122 or another database. The authentication engine then compares and analyzes the identification elements received from the user by comparing them against the user identification, password, and other identifying elements stored in the database. In another embodiment, in addition to authenticating the user by the financial institution system, the user may be authenticated locally by retrieving user's credential information stored in the memory of the mobile computing device.

After the financial institution system authenticates the user, the method 200 also includes receiving, at the mobile computing device, an indication that the user has been authenticated (220). For example, a personal greeting using the user's name may be displayed on a page of the application.

The method further includes receiving, from the financial institution system, information related to personalization of navigation control items for navigating a page of the application for the user (222). In embodiments of the present invention, personalization of the navigation control items refers to selecting, sorting, and highlighting a set of navigation control items by a server computer for the user based on business intelligence about the user. The business rules engine of the financial institution applies business rules to the user data to determine how the navigation control items should be personalized for the user's convenience and needs.

The business rules can be based on a variety of factors. In one embodiment, the business rules may relate to the user's own account information—a type of accounts owned by the user, values of accounts, or a frequency of access to each account by the user (via online, telephone, or in person). Based on these factors, a default set of navigation control items are selected for the user. In one embodiment, the navigation control items associated with primary service sections frequently accessed by the user are displayed at most prominent positioned on a page of the application. In another embodiment, the navigation control items associated with highest asset values may be displayed at most prominent positions on the user interface.

In another embodiment, the business rules may be based on a utilization pattern of application features by the user's peer group. For example, a suitable algorithm can be applied to aggregate behavioral data of a peer group (members who are similarly situated as the user financially or economically) to determine which features of the application are most frequently used. For example, if the peer group uses a navigation control item associated with banking services more frequently than a navigation control item associated with insurance services on the application, then the navigation control item for banking may be given a higher priority value than the navigation control item for insurance.

In some embodiments, the business rules can be driven by the business interest of a financial institution. For example, if the financial institution would like consumers to be more aware of its particular line of business or products, the navigation control items can be prioritized and organized based on the business interest of the financial institution. In another embodiment, the business rule can be driven by the subject matter. The navigation control items or tabs can be aligned in terms of natural clusters based on the subject matter. For example, the navigation control items for "pay bills" or "deposit/transfer" may be clustered next to the navigation control item for "banking" since paying bill and depositing/transferring funds are typically used together with banking services.

The navigation control items can be personalized for the user in various ways. The navigation control items may be personalized according to its position, color, size of fonts, size of icons, or the like on the user interface. For example, if previous transaction records online indicate that the user uses banking services more frequently than insurance services, then a navigation control item for banking can be arranged to be placed at a more visually prominent position. For example, if a horizontal tab bar is used to present navigation control items, a navigation control item with a higher priority value will be positioned towards a left hand side of the tab bar, which is a place to which the user's eyes are typically first drawn. If the navigation control items are to be arranged vertically (e.g., a vertical menu bar), then a navigation control item that will be most frequently used or more important to the user may be placed near the top of the menu.

Referring to FIG. 2A, the method further includes displaying, on a page of the application on the mobile computing device, navigation control items personalized for the user according to the information received from the financial institution system (224). In one embodiment, the personalized navigation control items are displayed on a page of the application concurrently with a personal greeting indicating that the user has been authenticated. When the personalized navigation control items are being displayed, an explicit message may be conveyed to the user that the navigation control items are being sorted and organized for the user's convenience. Typically, the navigation control items are personalized and custom configured when the user first ever launches the application. The personalized navigation control items can be also re-customized and updated if the user data or applicable business rules change.

In one embodiment, a default set of navigation control items previously displayed on a page of the application (e.g., on a launch page) can be replaced with a new set of personalized navigation control items in step 224. In another embodiment, a launch page or introductory page of the application may not include any navigation control items. In this embodiment, personalized navigation control items are populated, for example in a tab bar, on a page of the application after the user has been authenticated and the user's account type and status have been analyzed by the financial institution system.

If the user would like to modify the personalized navigation control items, the user is allowed to further customize the personalized navigation control items on a page of the application. As an example, the user can change the configuration of a tab bar by dragging desired navigation control items into the tab bar.

In embodiments of the present invention, the personalized navigation control items can be stored in the application for a subsequent application launch, optimizing the user's experience for frequent use of the application. The configuration of personalized navigation control items can be also synchronized with a financial institution system server, ensuring that the user's experience can remain consistent across multiple client devices or when recovering from a re-installation of the application.

While the method 200 shown in FIG. 2A discusses personalizing navigation control items associated with primary service sections of the application at the top tier (e.g., first level) of the application, the navigation control items for subsequent levels can be also personalized according to business rules and user data. For example, upon selecting an "investment" tab as a navigation control item at the first level of the application architecture, navigation control items at the second level of architecture associated with the investment section (e.g., trade, research, transfer funds, or the like) can be sorted and organized for the user's convenience according to business rules and user data.

It should be appreciated that the specific steps illustrated in FIG. 2A provide a particular method of providing personalized navigation control items on a page of an application according to an embodiment of the present invention. Other sequences of steps may also be performed according to alternative embodiments. For example, alternative embodiments of the present invention may perform the steps outlined above in a different order. Moreover, the individual steps illustrated in FIG. 2A may include multiple sub-steps that may be performed in various sequences as appropriate to the individual step. Furthermore, additional steps may be added or removed depending on the particular applications. For example, features described in other figures or parts of the application can be combined with the features described in FIG. 2A. One of ordinary skill in the art would recognize many variations, modifications, and alternatives.

Figure 2B:
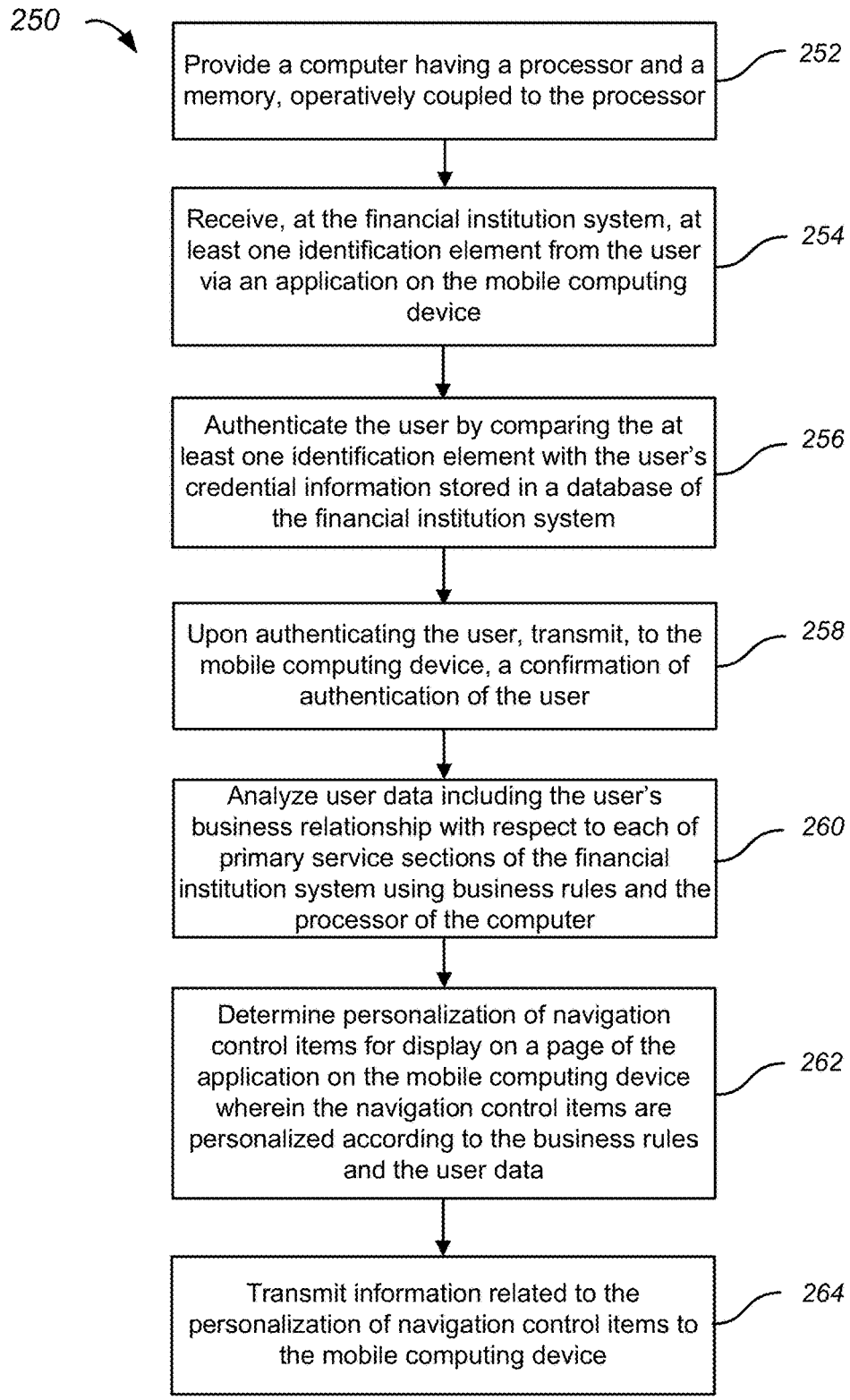
FIG. 2B is a high level flowchart illustrating a method of providing information related to personalization of navigation control items for an application from the perspective of a financial institution system according to an embodiment of the present invention.

FIG. 2B is a high level flowchart illustrating a method 250 of generating personalization of navigation control items from the perspective of a financial institution system (e.g., a server computer) according to one embodiment of the present invention. As shown in FIG. 2B, the method 250 includes providing a computer having a processor and a memory, operatively coupled to the processor (252). The computer can be a server computer of the financial institution system which can interact with a user via an application on a mobile computing device.

The method 250 includes receiving, at the financial institution system, at least one identification element from the user via an application on the mobile computing device (254). The identification elements include information such as a user ID, a password, PINs, secret phrases, biometrics, or other credentials used to authenticate the user. The authentication engine of the financial institution may authenticate the user by comparing the received identification element with the user's credential information stored in the customer database 122 or another database (256). Upon authenticating the user, confirmation of the user authentication is transmitted to the mobile computing device (258).

During or subsequent to the user authentication process, user data including the user's account information is analyzed using business rules and the processor of the computer to prioritize and organize navigation control items for the application (260). The business rules engine of the financial institution system can retrieve business rules and apply the rules to the user's data. The business rules can be based on the user's account types and status and/or the frequency of user's interaction with certain service sections of the financial institution in person, over telephone, via website, or the like. In some embodiments, the business rules can be based on aggregate behavior of the user's peer group.

As an example, navigation control items that are associated with accounts owned by the user can be positioned most prominently for the user. As an illustration if the user owns bank accounts but do not own insurance policies, then a navigation control item (e.g., tab) associated with banking may be displayed at the most visually prominent place, such as on the left hand side of a horizontal tab bar.

In another example, navigation control items may be prioritized and organized based on the frequency of account access or interaction with the user. As an illustration, if transaction records of the financial institution system indicate that the user conducts most transactions with the investment section of the financial institution system followed by the banking section, then the investment section may be assigned a higher priority value compared to the banking section according to the business rules. Based on the assigned priority values, a navigation control item associated with the investment section may be positioned at a more visually prominent place than a navigation control item associated with the banking section.

In yet another example, the business rules can also be based on aggregate behavior of the user's peer group (members of which are similarly situated as the user financially or economically). If analysis of the user's peer group transaction records by suitable software indicates that the user's peer group utilizes certain features more than other features, more highly utilized features can be given higher priority values. Navigation control items associated with more highly utilized features can be placed at more visually prominent places on a page of the application according to the assigned priority values.

In some embodiments, the business rules can be driven by the business interest of a financial institution. If the financial institution would like its consumers to be more aware of a particular line of business or product, the navigation control items can be prioritized and organized based on these factors. In another embodiment, the business rule can be driven by the subject matter. The navigation control items can be aligned in terms of natural clusters of subject matter and grouped together.

Referring to FIG. 2B, the method includes generating personalization of navigation control items for display on a page of the application on the mobile computing device wherein the navigation control items are personalized according to the business rules and the user data (262). As discussed above, personalization of navigation control items can include prioritizing and organizing navigation control items for the user on a page of the application. The organization and prioritization can be based on the user's previous transaction history with the financial institution, the peer group's utilization pattern of features, the financial institution's business interest, or the like.

In one embodiment of the present invention, personalization of navigation control items may include organizing and prioritizing them according to their priority values. For example, one or more factors associated with the user data can be assigned certain point values. For example, if a user utilizes banking services 10 times more than insurance services and if the same user utilizes investment services 5 times more than the insurance services, then navigation control items associated with these services may be assigned point values according to their utilization frequency. For example, a navigation control item for banking services may be assigned 10 points, a navigation control item for investment services may be assigned 5 points, and a navigation control item may be assigned 1 point.

Based on these assigned priority values, the navigation control items may be organized and prioritized on a user interface. For example, the navigation control items can be assigned to certain position, color, size of fonts, size of icons, or the like on a graphical user interface. For example, if the banking tab will be more frequently used than the insurance tab, the banking tab may be positioned on the left hand side relative to the insurance tab in a horizontal tab bar on a page of the application. Alternatively, the banking tab may be positioned near the top of a vertical menu, above the insurance tab. In another example, if the banking tab will be more frequently used than the insurance tab, then the "banking" tab may be shown in a larger text than the "insurance" tab. These are mere examples of personalization of navigation control items, and other variations and within the scope of the present invention.

Upon determining personalization of navigation control items, the information related to the personalization of navigation control items is transmitted to the mobile computing device (264). The mobile computing device may then process the received information and display the personalized navigation control items that have been organized and prioritized for the user on a page of the application.

In embodiments of the present invention, the financial institution system can determine personalization of navigation control items at different time points. In one embodiment, personalization of navigation control items can be determined when a user launches and logs into the application for the first time via the mobile computing device. For the first time users of the application, the financial institution system customizes the architecture around the users' business relationship with the financial institution system. In another embodiment, personalization of navigation control items may be updated for the user when the financial institution changes or updates the business rules applied by the business rules engine. In yet another embodiment, the personalization of navigation control items may be updated due to the dynamic nature of the user's financial data and transactions. For example, if the user's utilization frequency of primary service sections changes over time, then priority values assigned to navigation control items can also change, resulting in updating the personalization of navigation control items.

It should be appreciated that the specific steps illustrated in FIG. 2B provide a particular method of providing information related to personalization of navigation control items from the perspective of the financial institution system (e.g., a server computer) according to an embodiment of the present invention. Other sequences of steps may also be performed according to alternative embodiments. For example, alternative embodiments of the present invention may perform the steps outlined above in a different order. Moreover, the individual steps illustrated in FIG. 2B may include multiple sub-steps that may be performed in various sequences as appropriate to the individual step. Furthermore, additional steps may be added or removed depending on the particular applications. For example, features described in other figures or parts of the application can be combined with the features described in FIG. 2B. One of ordinary skill in the art would recognize many variations, modifications, and alternatives.

Figure 3A:
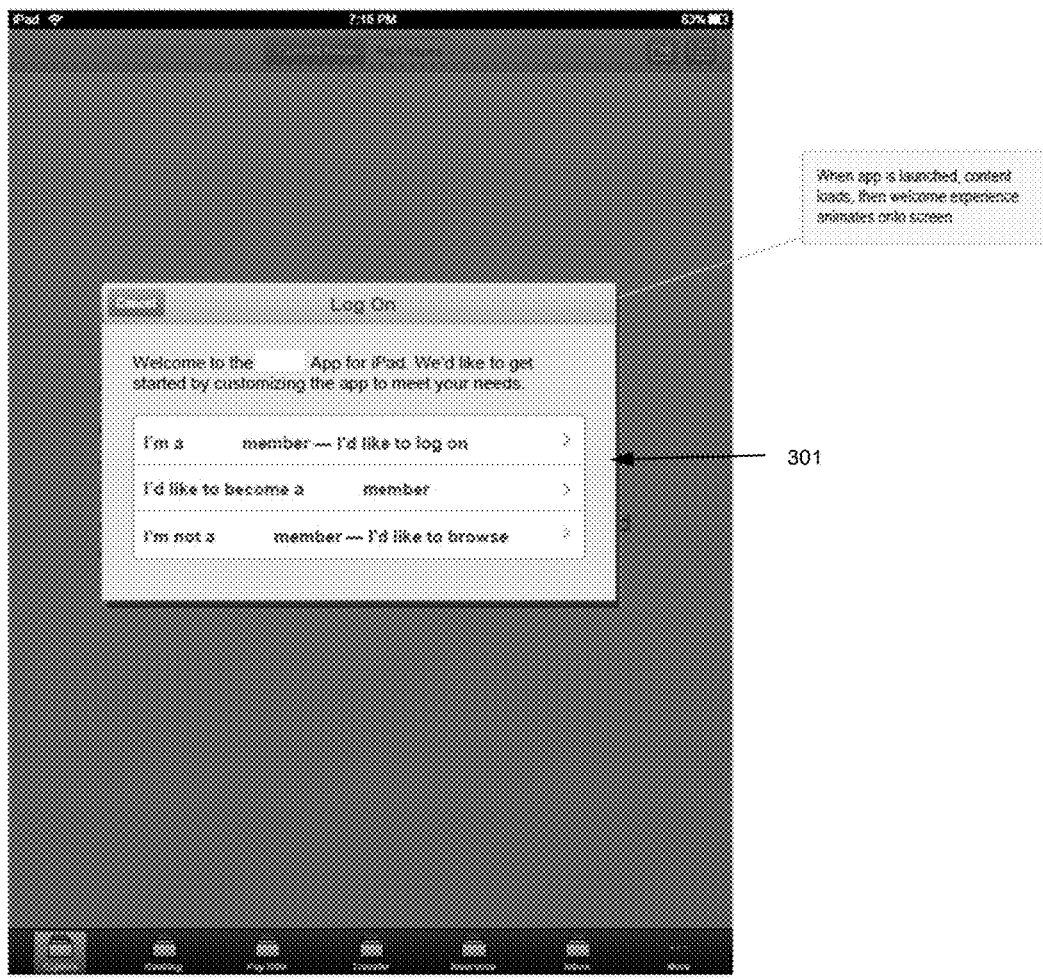
FIG. 3A is a screenshot of a page of an application showing a modal window for determining a user profile according to an embodiment of the present invention.

FIG. 3A is a screenshot of an exemplary page of an application when the application is launched in a mobile computing device. While many figures in the present application illustrate schematic views of pages of an application on an iPad™ or iPhone™, embodiments of the present invention can be applied to any suitable platforms. These include, for example, Window™, Objective C™, Linux™, Android™, or the like. Thus, an application in accordance with the present invention can be used with any suitable touch-screen mobile devices. The concepts described in the present application can be also applied to a website design for non-mobile computing devices (e.g., a desk top) or a mobile website.

In the embodiment shown in FIG. 3A, the content loads and then a welcome modal window 301 shown in FIG. 3A animates onto the screen. In the embodiment shown in FIG. 3A, a user has an option to select one of three user profile choices:

1. "I'm a member—I'd like to log on"
2. "I'd like to become a member"
3. "I'm not a member—I'd like to browse."

In FIG. 3A, touching outside of the frame may dismiss the modal window. The modal window may be tucked off in a corner of a screen where it is easy to retrieve with a touch.

In another embodiment, the welcome log-on modal window shown in FIG. 3A appears after the user taps one of the tabs (e.g., Banking, Pay Bills, Transfer, Insurance, or the like) in the tab bar on the bottom of the screen to a secure access to the financial institution system. Tapping a tab for the first time during a session displays a background user interface template for that section (already profiled to prospect, member-owner, member-prospect, or the like). When a user indicates that the user is a member, then the screen transitions to a log-on window shown in FIG. 3B. When the user indicates that the user is not a member but would like to browse, then the modal window is dismissed and the application is then profiled for a prospect experience. When the user indicates that the user would like to become a member, then a new window appears indicating that the user is leaving the application to open a web page in Safari. The window also includes buttons for "Cancel" or "Continue."

Figure 3B:
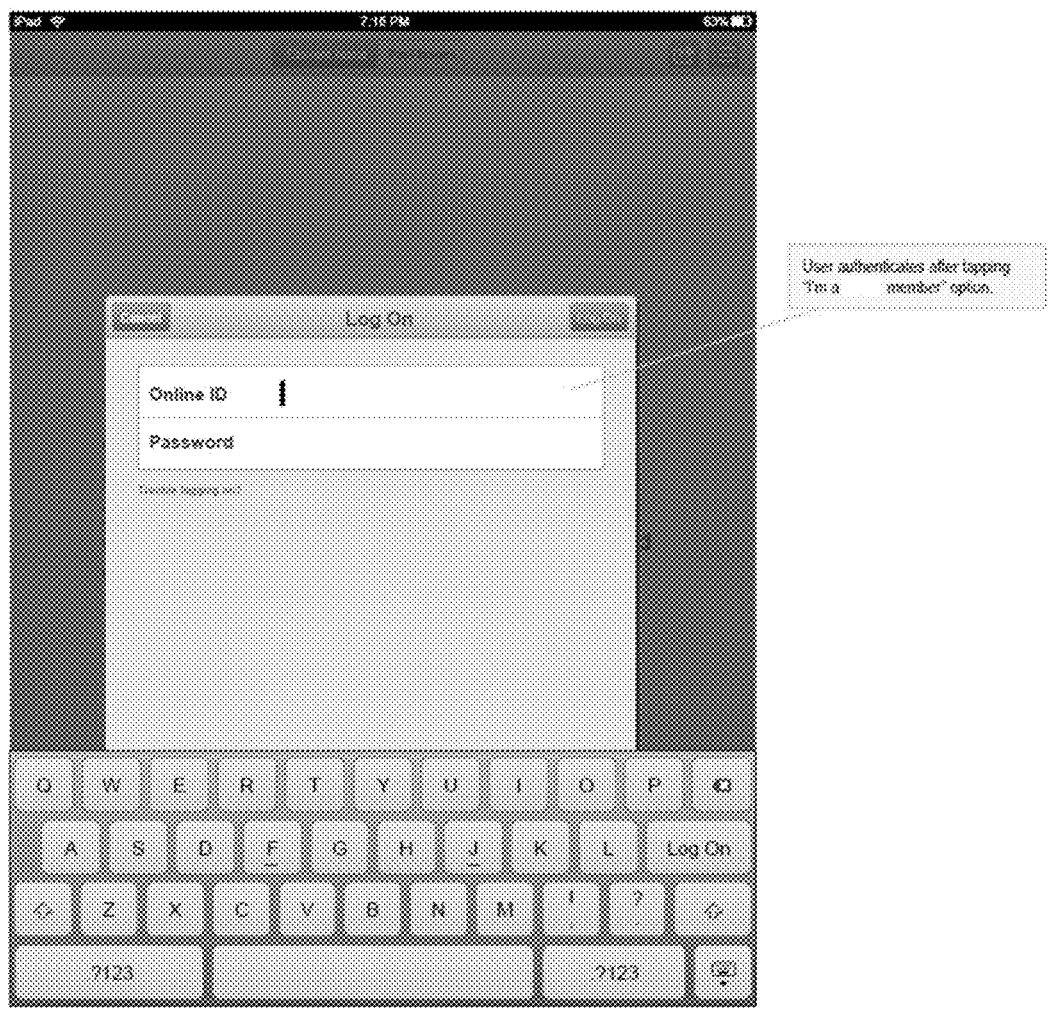
FIG. 3B is a screenshot of a page of an application illustrating a user log-on window according to an embodiment of the present invention.
Figure 3C:
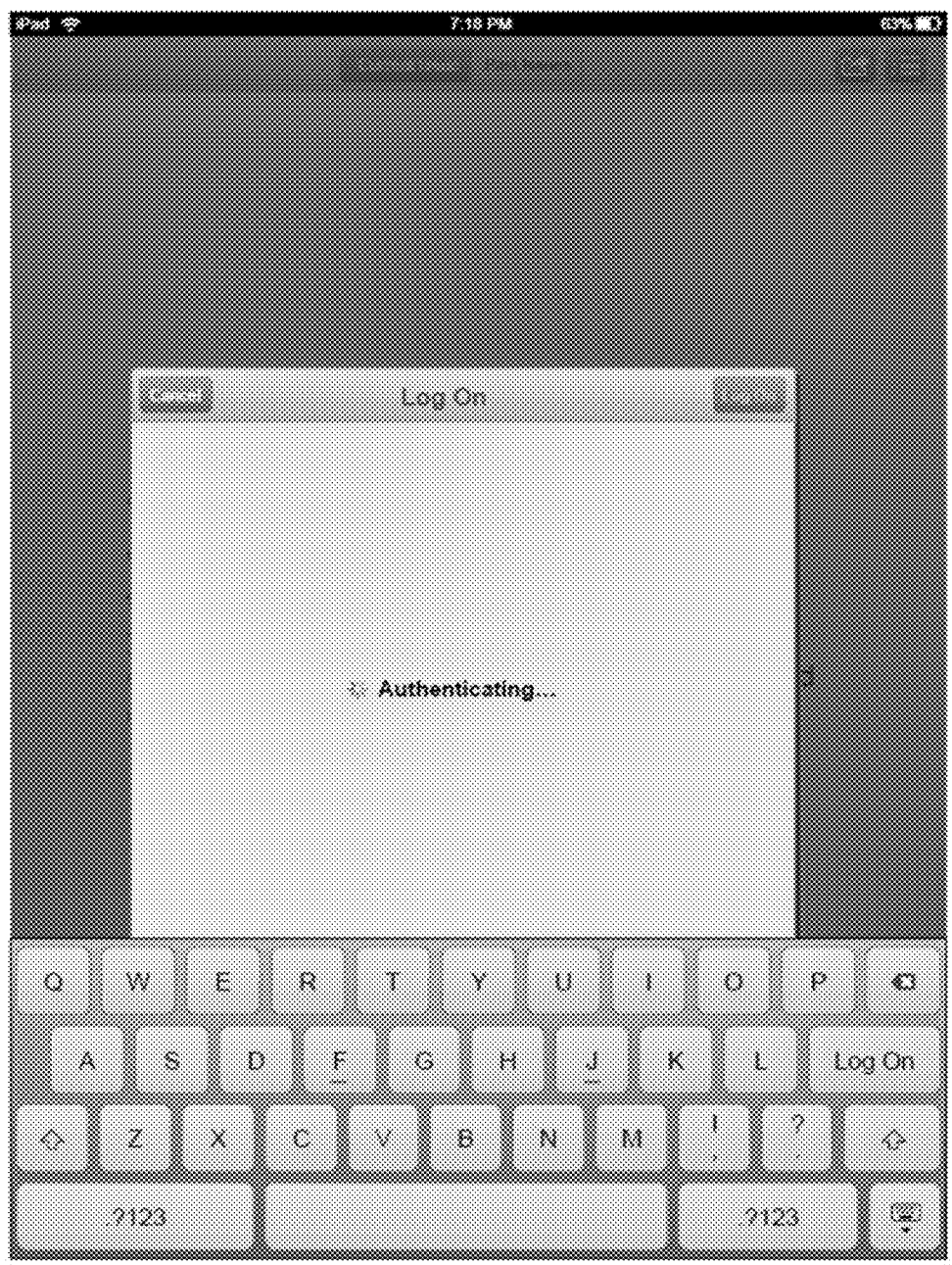
FIG. 3C is a screenshot of a page of an application illustrating user authentication according to an embodiment of the present invention.

FIGS. 3B and 3C illustrate a log-on window that appears to the screen when the user taps "I'm a member" option shown in FIG. 3A. FIG. 3B shows a log-on window, in which the user can input the user's online ID and password. The user's log-on information is transmitted to the financial institution system. While the financial institution system (e.g., a server computer) authenticates the user, an "Authenticating . . . " message is displayed on the screen of the mobile computing device as shown in FIG. 3C.

Figure 3D:
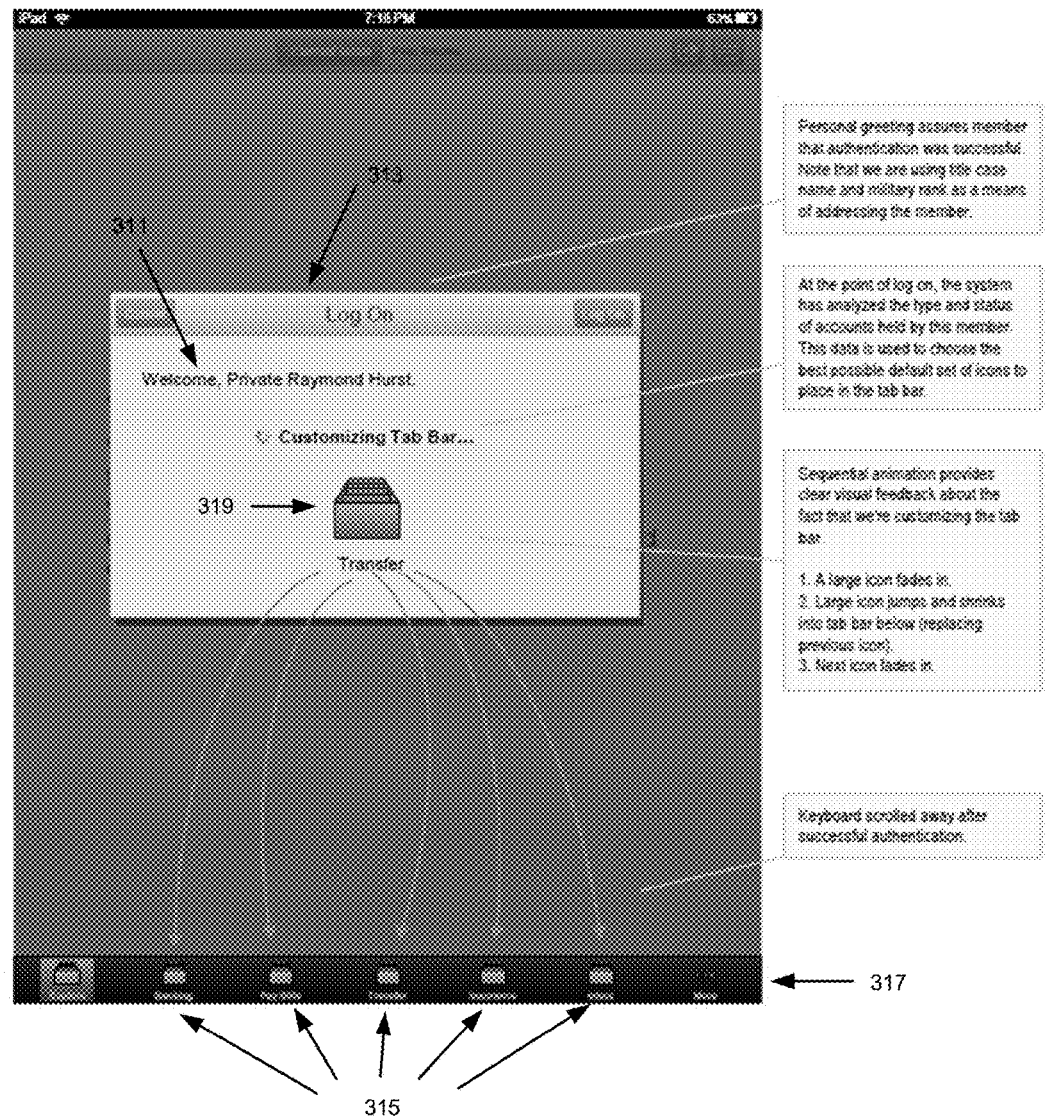
FIG. 3D is a screenshot of a page of an application illustrating personalization of navigation control items in a tab bar according to an embodiment of the present invention.

FIG. 3D illustrates an exemplary screenshot of an application when the user authentication process has been completed. A personal greeting 311 shown on a log-on modal window 313 assures the user that authentication was successful. During the log on process, the financial institution system has analyzed the type and status of accounts held by the member. This data can be used to choose the best possible default set of icons or tabs 315 to place in a tab bar 317. After determining the business relationship with the financial institution, the navigation control items or tabs 315 can be populated and reordered in the tab bar.

In the embodiment illustrated in FIG. 3D, a sequential animation can provide a clear visual feedback to the user about the fact that the tab bar is being customized and personalized for the user. For example, a large icon 319 shown in the log-on modal can fade in. Then the large icon 319 can jump and shrink into the tab bar 317 shown below, replacing the previous icons or tabs shown in the launch state. Then the next icon or tab fades in. During the animation, the keyboard shown in FIG. 3C can be scrolled away after a successful authentication.

In the embodiment illustrated in FIG. 3D, the financial institution system may have determined that the user has used the banking services of the financial institution more frequently than the insurance services. Thus, the banking tab has been placed towards the left hand side of the tab bar 317, which is typically the most visually prominent place in a horizontal cluster of icons.

Figure 3E:
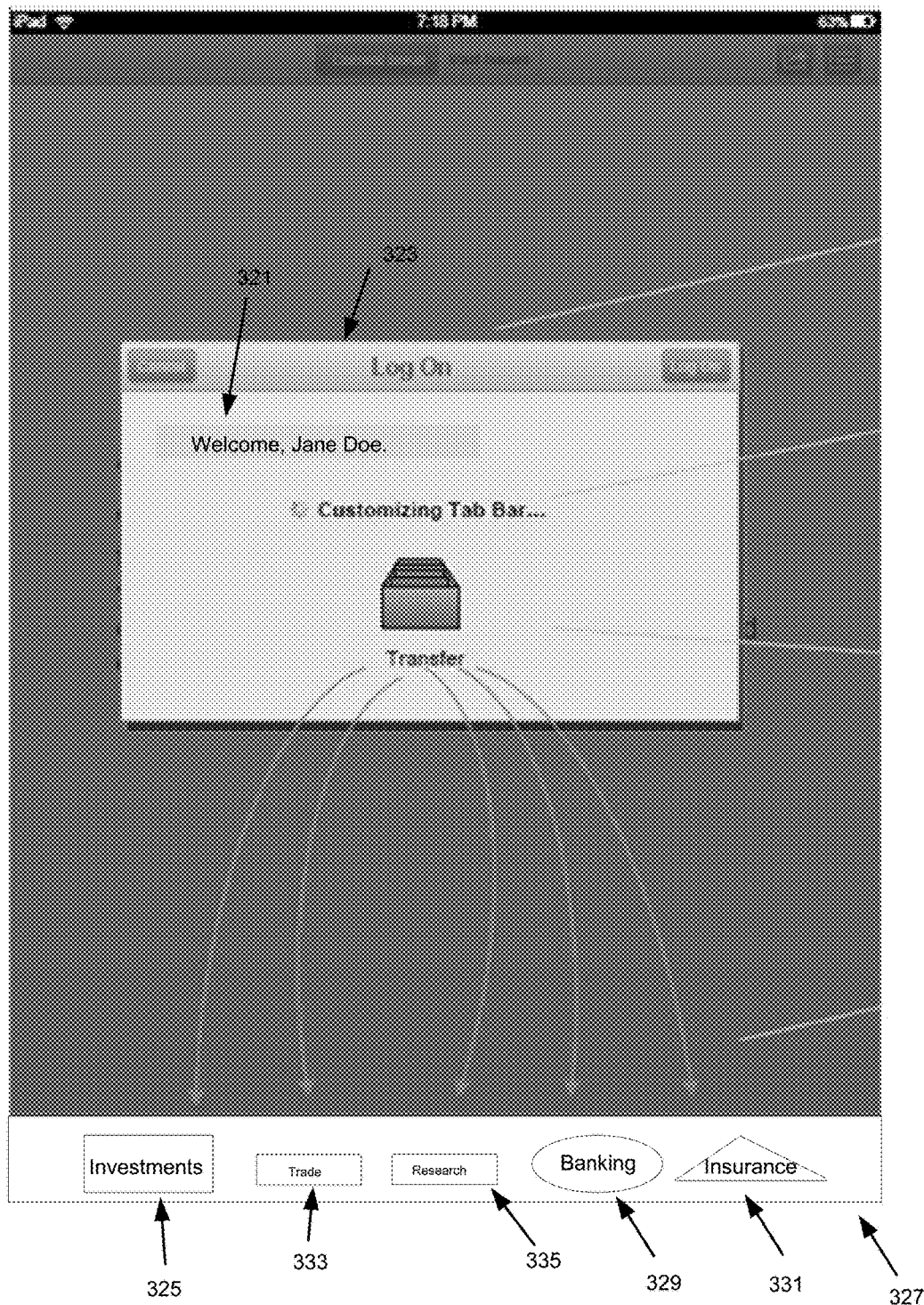
FIG. 3E is a screenshot of a page of an application illustrating personalization of navigation control items in a tab bar according to another embodiment of the present invention.

FIG. 3E illustrates another exemplary screenshot of an application showing personalization of navigation control items. When Jane Doe has been authenticated as a customer of the financial institution, a message 321 indicating confirmation of user authentication is displayed on a log-on modal window 323. During the log-on procedure, the financial institution system has determined that Jane Doe has investment accounts, banking accounts, and insurance accounts with the financial institution system. In the embodiment illustrated in FIG. 3E, the financial institution system has further determined that Jane Doe frequently trades on her investment accounts and utilizes investment services more frequently, followed by banking services, and then insurance services. Thus, as illustrated in FIG. 3E, a navigation control item 325 associated with the investment section has been placed on the left hand side in a tab bar 327. On the other hand, a navigation control item 329 associated with the banking section and a navigation control item 331 associated with the insurance section have been placed towards the right hand side of the tab bar 327. Since trading and researching are tasks associated with investment services, navigation control items 333 and 335 associated with trading and researching, respectively, are clustered next to the navigation control item 325 associated with the investment section.

In FIG. 3E, the shapes of navigation control items are differentiated by the subject matter, and they are personalized using different shapes, shape sizes, and text sizes. For example, the navigation control items associated with investment services and their tasks (e.g., trade and research) are in the shape of a rectangle. The navigation control item associated with the banking services is in the shape of an ellipse, and the navigation control item associated with the insurance services is in the shape of a triangle. Furthermore, since trading and researching are common tasks performed while utilizing investment services, the navigation control items for these common tasks are shown in smaller icons and text sizes.

Figure 4A:
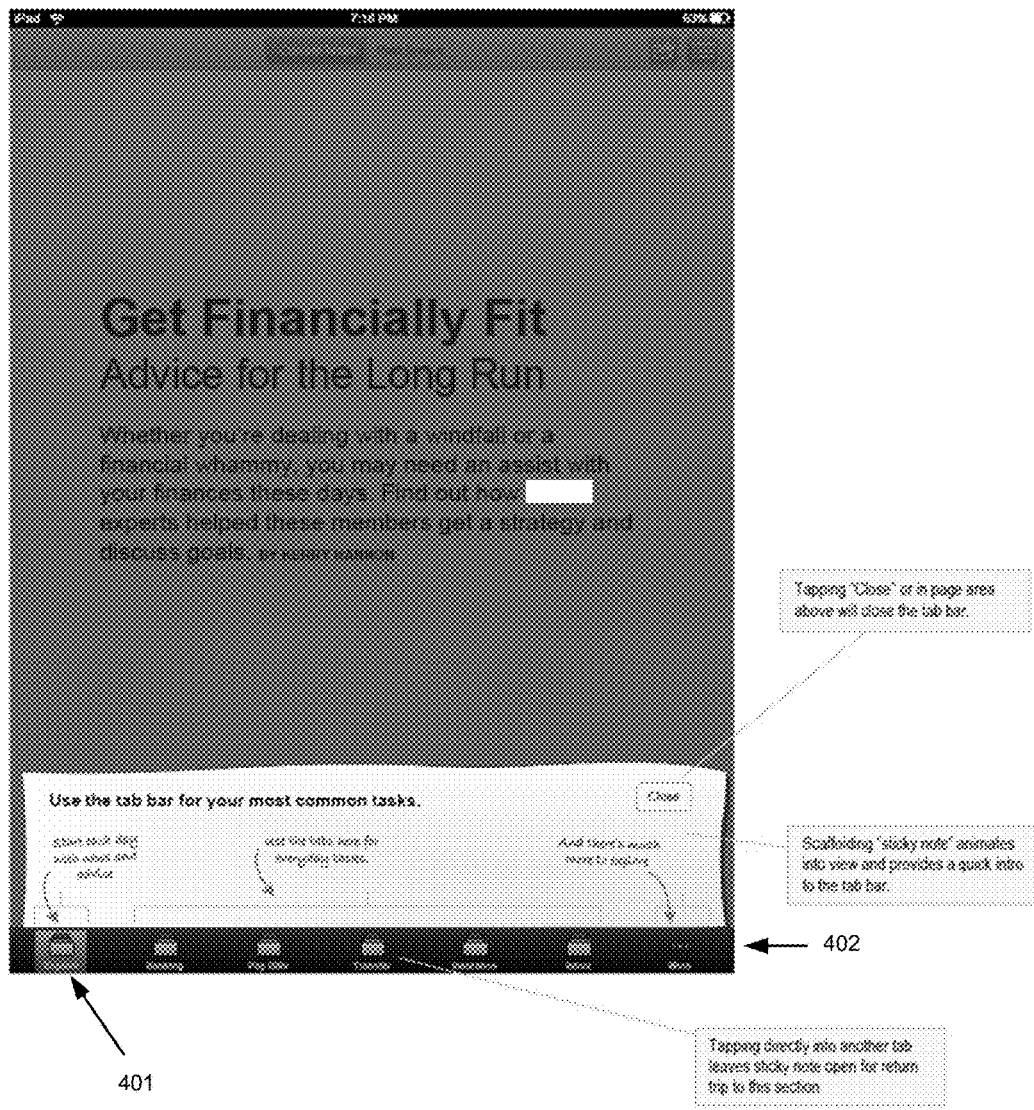
FIG. 4A is a screenshot of a page of an application illustrating features of a tab bar according to an embodiment of the present invention.

FIG. 4A illustrates a screenshot of an exemplary page of an application when the "Explore" tab 401 is selected in a tab bar 403. In the embodiment shown in FIG. 4A, the tab bar 403 is the primary means of navigating primary service sections in a mobile application. The tab bar is used for most common tasks, including viewing banking, insurance, investment, transfer, pay bills, or the like. When the user has opened one tab (e.g., "Transfer" tab), tapping directly into another tab leaves sticky note open for a return trip to the open tab. Thus, during a single session, the user can move back and forth between tabs. The user's view state can be preserved when moving across the tabs (scroll state, show/hide toggle, or the like). If a user deep-dived and interacted extensively into the content of any given tab, re-tapping the parent tab can take the user back to the original parent tab view. Also, the user can interact extensively into each tab into a specific set of data (for example, from the investments tab into an account summary view, and from that account summary to a particular scroll state, or the like). The view state can be preserved for the user's reverse path. The view state can be discarded elsewhere.

Figure 4B:
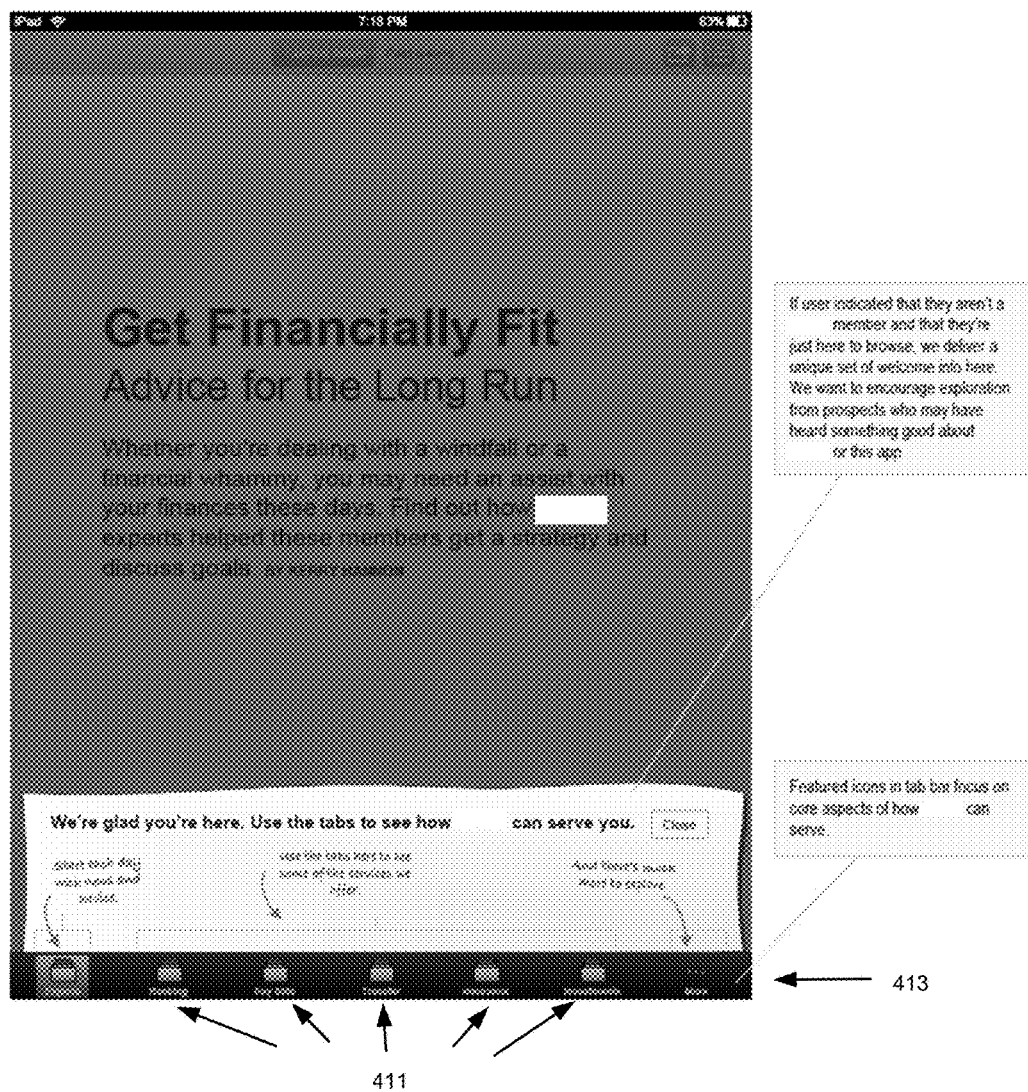
FIG. 4B is a screenshot of a page of an application illustrating features of a tab bar for prospects according to an embodiment of the present invention.

FIG. 4B illustrates a screenshot of an exemplary page of an application when the user indicated that the user is not a member of the financial institution on the screen shown in FIG. 3A and that the user wants to browse the application. The application delivers a unique set of welcome information to encourage exploration of the application for prospects. The featured icons 411 in the tab bar 413 shown in FIG. 4B focus on core aspects of how the financial institution can serve a customer.

FIGS. 5A through 5E illustrate screenshots of an iPhone™, which has a smaller screen size than iPad™ shown in FIG. 3A through FIG. 4B. Thus, the navigation control items associated with main features of the application are displayed in a menu form rather than in a horizontal tab bar as shown in FIGS. 3A through 4B.

Figure 5A:
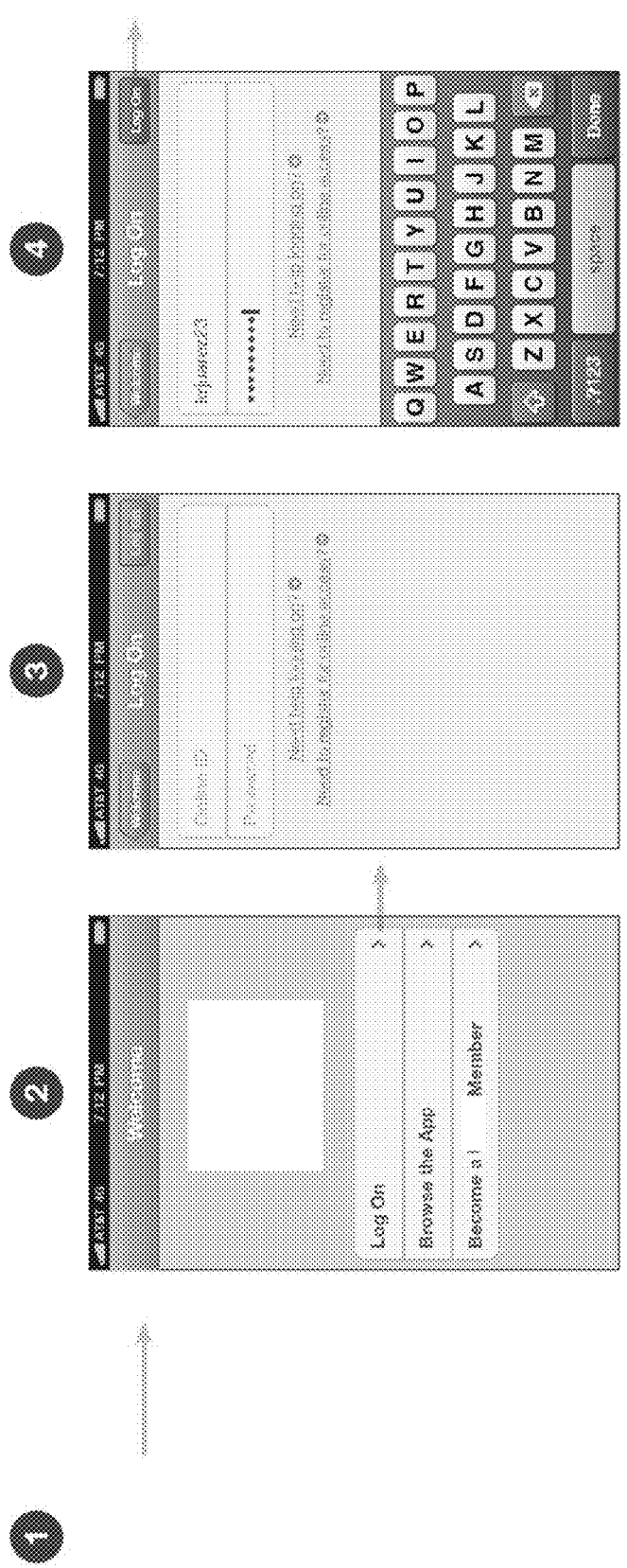
FIGS. 5A through 5C illustrate screenshots that illustrate a personalized information architecture of an application for first-time logon of a user according to an embodiment of the present invention.
Figure 5B:
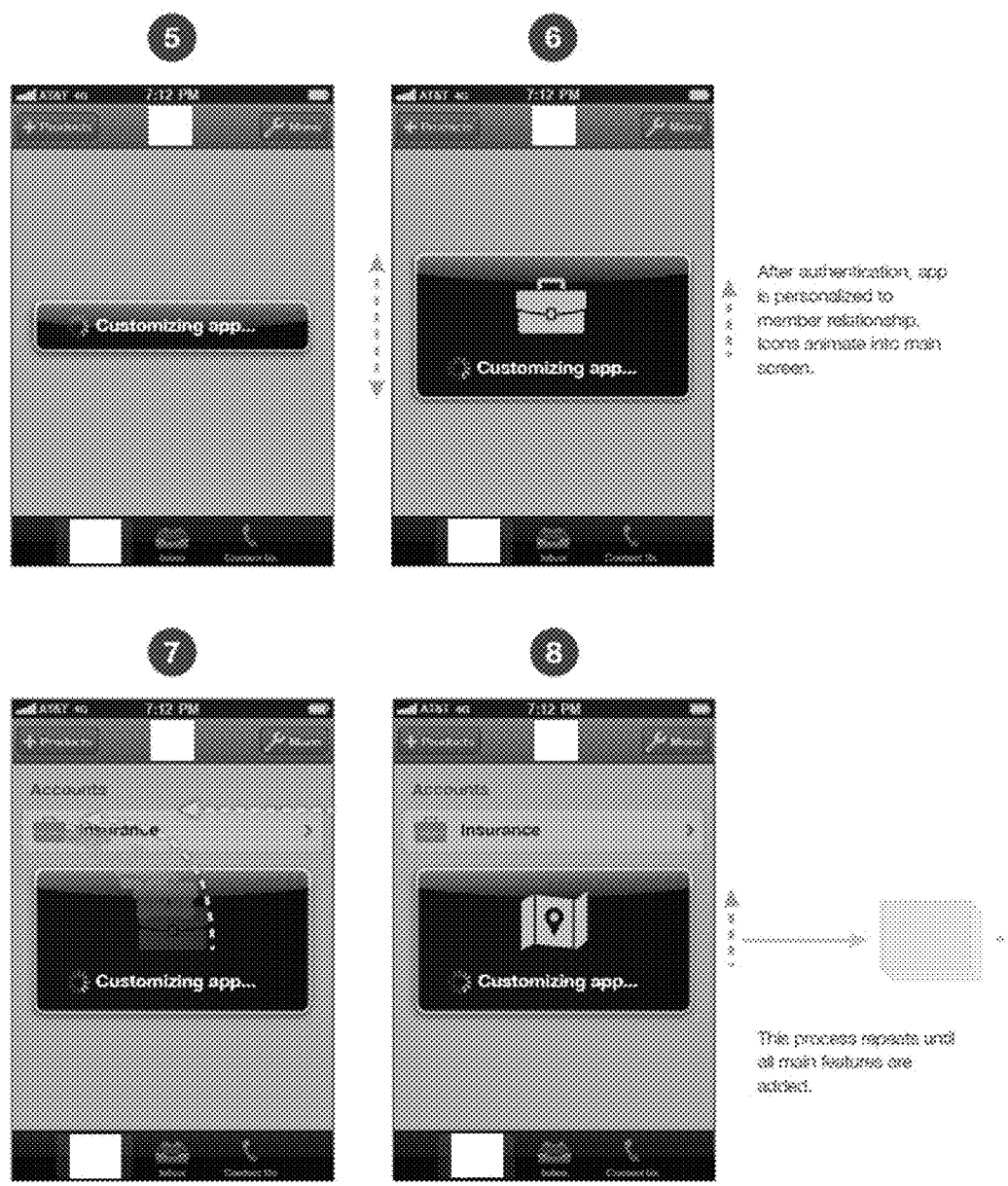
Figure 5C:
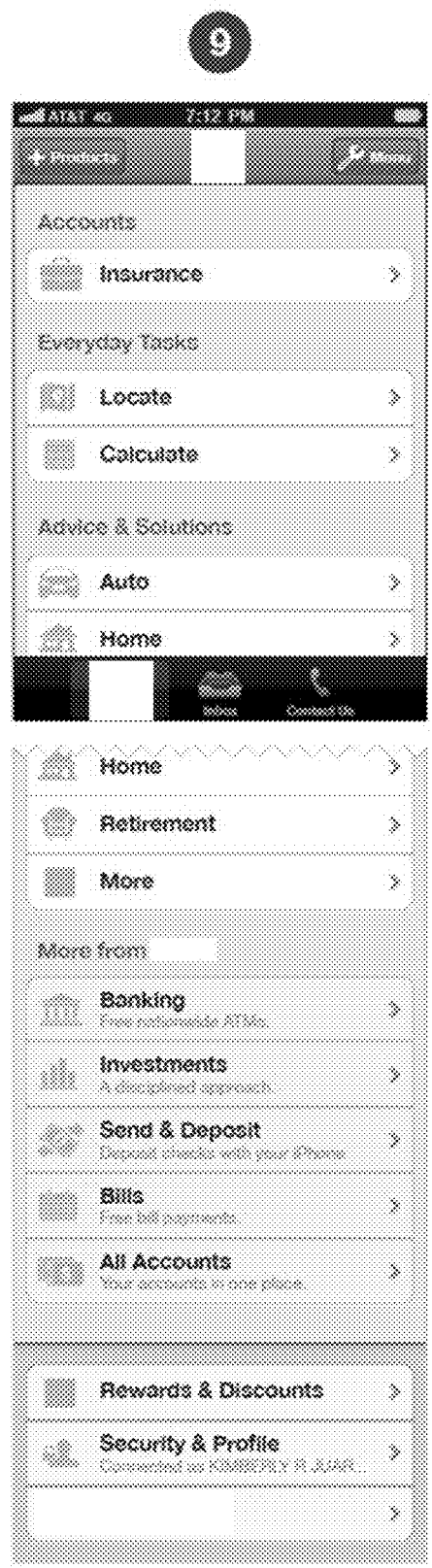

FIGS. 5A through 5C illustrate screenshots of exemplary pages of an application which illustrate personalized information architecture when a customer logs onto the application for the first time. When the user launches an application on the user mobile computing device in Screen 1 shown in FIG. 5A, a welcome page is displayed as shown in Screen 2. When the user selects a "log on" option on Screen 2, a log-on screen shown in Screen 3 is displayed for the user. As shown in Screen 4, the user can input an online ID and password.

FIG. 5B illustrates customization (personalization) process of the application by the financial institution system. As shown in Screens 5 and 6, a message that the application is being customized is displayed on the screen of the mobile computing device. After authentication, the application is personalized according to the customer's business relationship with the financial institution. Icons animate into the main screen. As shown in Screen 7, a navigation control item associated with insurance services (which is determined by the financial institution system to have the highest priority value for the customer) is placed at the top of the screen. As shown in Screen 8, customization and populating the main screen with navigation control items repeat until all main features have been added.

FIG. 5C illustrates Screen 9, when the application is ready for use. FIG. 5C illustrates a screen of the mobile computing device with navigation control items associated with the main features. Additional main features can be seen when the user scrolls down the screen. As shown in FIG. 5C, the navigation control for insurance accounts is placed at the top position of the screen because the user has only insurance accounts with the financial institution. The navigation control items for banking and investments are shown towards the bottom of the screen under the "More" section, because the user may not yet have these accounts with the financial institution or are under-utilized compared to the insurance accounts.

Figure 5D:
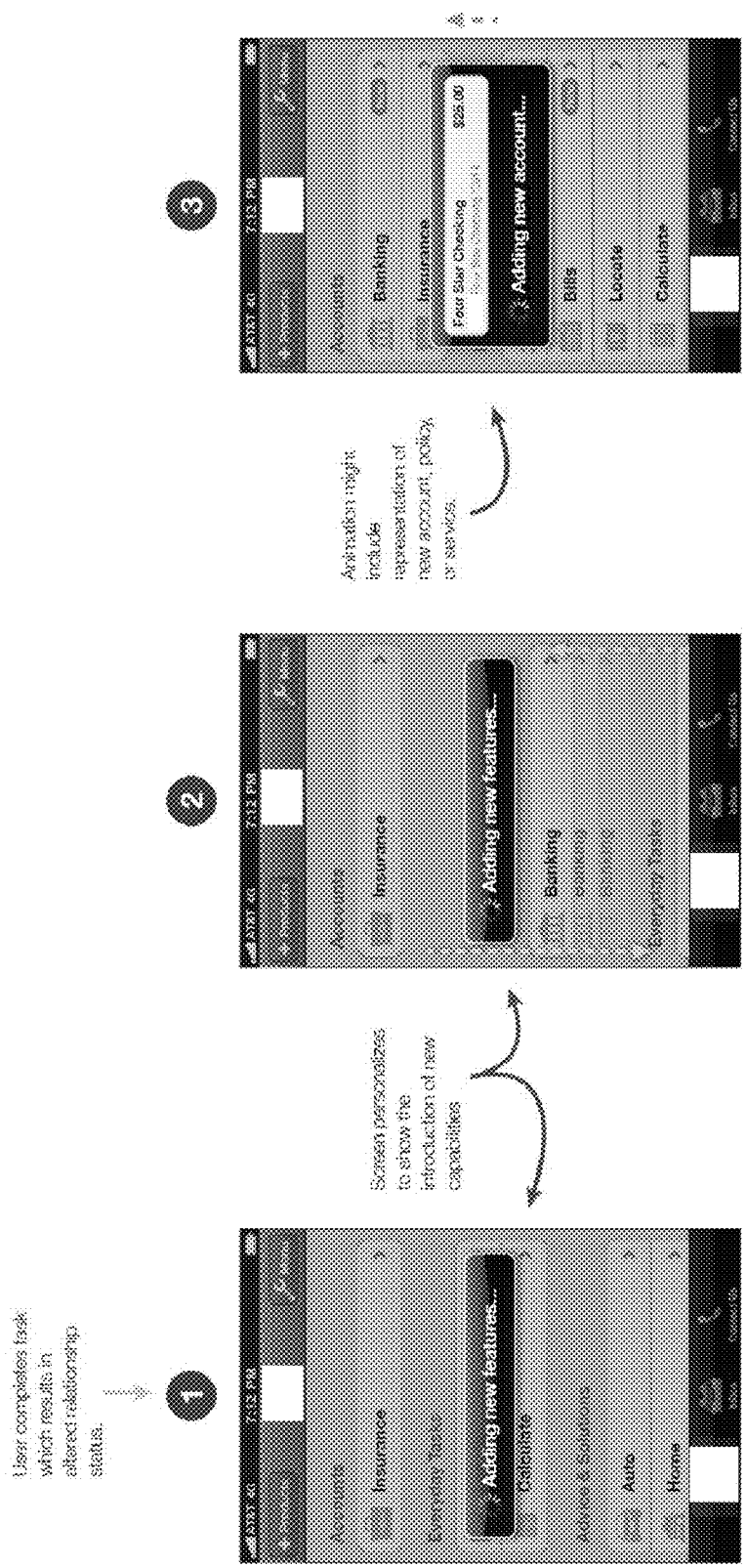
FIGS. 5D through 5F illustrate screenshots that illustrate a personalized information architecture during the user's change in business relationship with a financial institution according to an embodiment of the present invention.
Figure 5E:
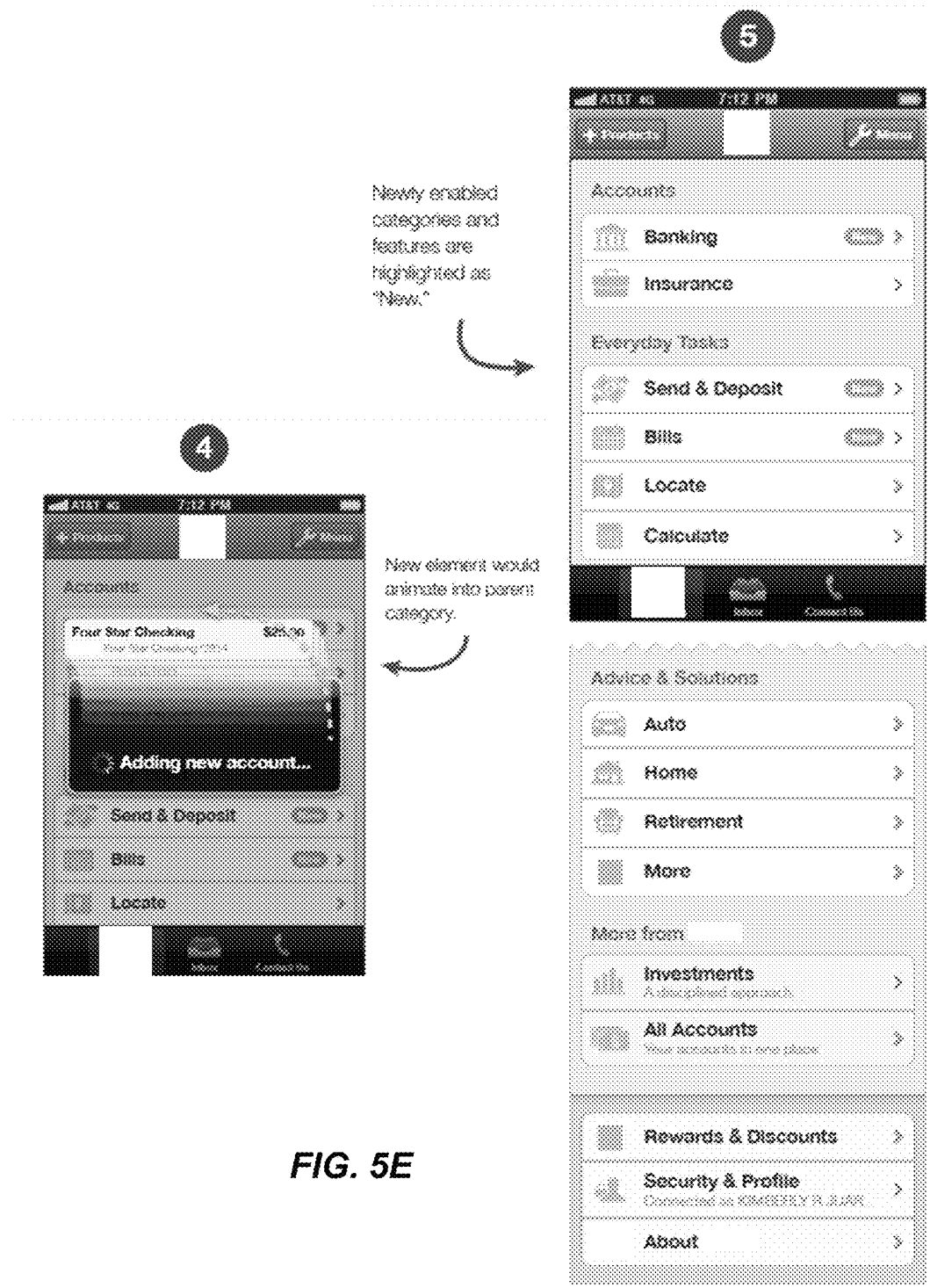
Figure 5F:
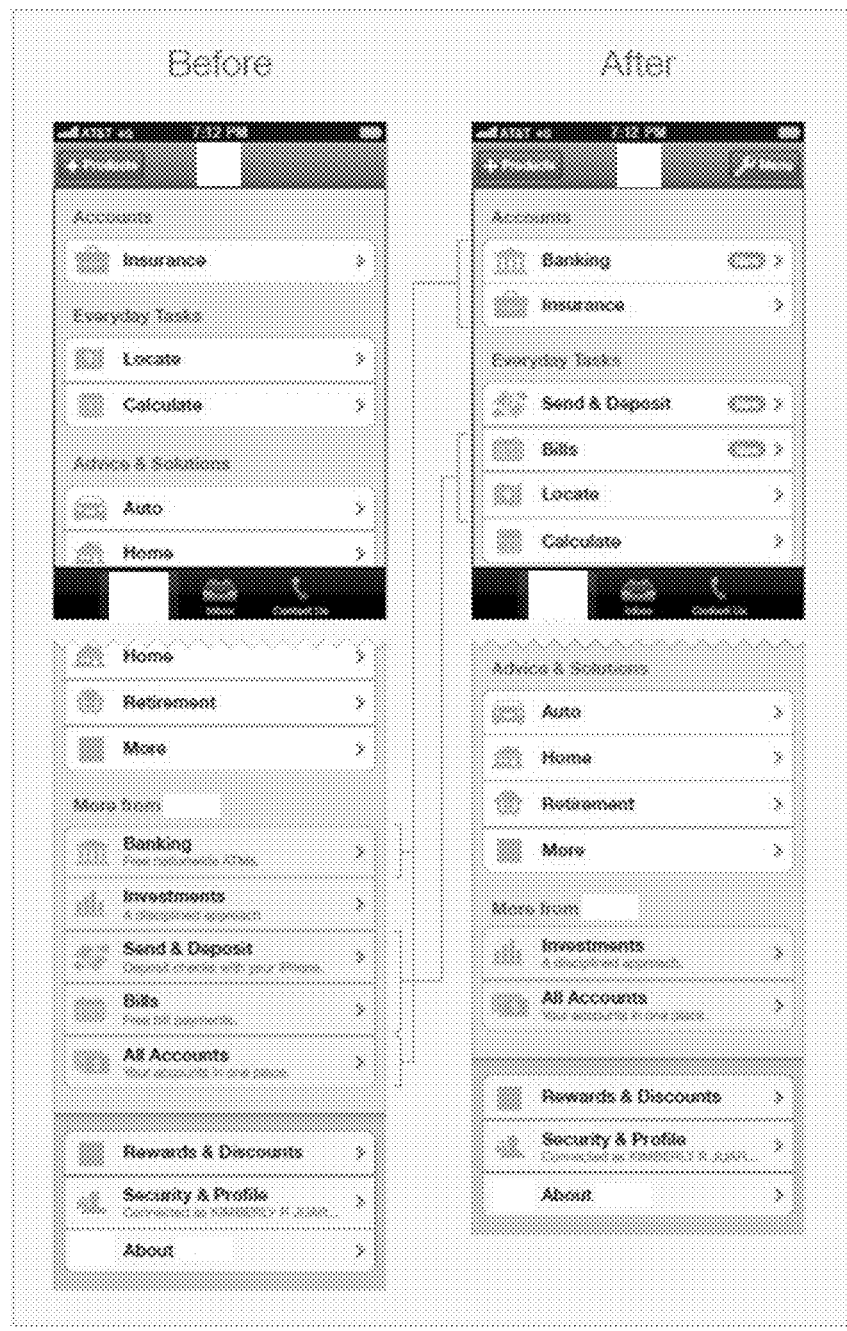

FIGS. 5D through 5F illustrate screenshots of exemplary pages of an application which illustrate personalized information architecture when the customer's business relationship changes with the financial institution. In Screen 1 shown in FIG. 5D, the customer completes a task (e.g., opening a checking account) which results in an altered relationship status with the financial institution. As shown in Screen 1 of FIG. 5D, the screen of the mobile computing device provides an explicit message for the customer: "Adding new features . . . " Screen 2 of the mobile computing device shows an animation of the navigation control item for banking moving upward and the navigation control item for insurance moving downward, explicitly illustrating personalization of the screen to show the introduction of new capabilities. As shown in Screen 3 of FIG. 5D, animation might include representation of new account, policy, or services.

In FIG. 5E, Screen 4 shows the new element (i.e., banking account) animating into the parent category, under "Accounts." FIG. 5E, Screen 5 illustrates a user interface of the mobile computing device, ready with navigation control items that have been personalized according to the altered business relationship with the financial institution. The newly enabled categories and features are highlighted as "New" in Screen 5. Under "Accounts" menu, the navigation control item for banking has been added on top of the navigation control item for insurance. Under "Everyday Tasks" menu, the navigation control items for "Send & Deposit" and "Bills" have been added.

In FIG. 5F illustrates two screenshots before and after updating the personalized information architecture based on the change in the customer's relationship with the financial institution. The architectural elements that are now owned by the member are brought to the forefront and highlighted with "New" indicators.

Figure 7A:
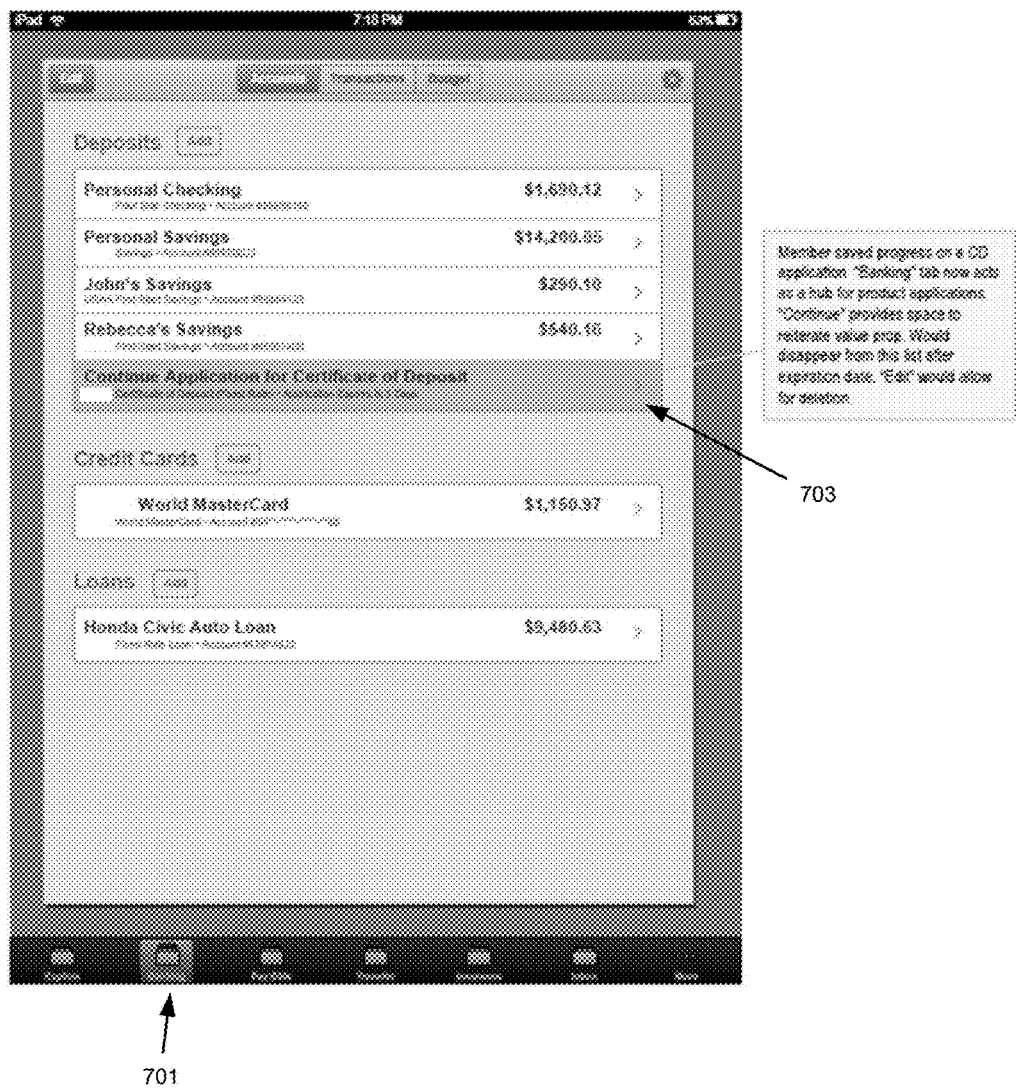
FIGS. 7A-7C are various screenshots of pages of an application illustrating details of banking accounts.

FIG. 7A illustrates a screenshot of an exemplary page of an application showing accounts when a user taps on a "Banking" tab 701. As shown in FIG. 7A, a user can save progress on a CD application 703. The "Banking" tab now acts as a hub for product applications. Selecting "Continue Application for Certificate of Deposit" on the screen provides a space to reiterate the value proposition. If the application is not completed by an expiration date, "Continue Application for Certificate of Deposit" would disappear from the screen.

Figure 7B:
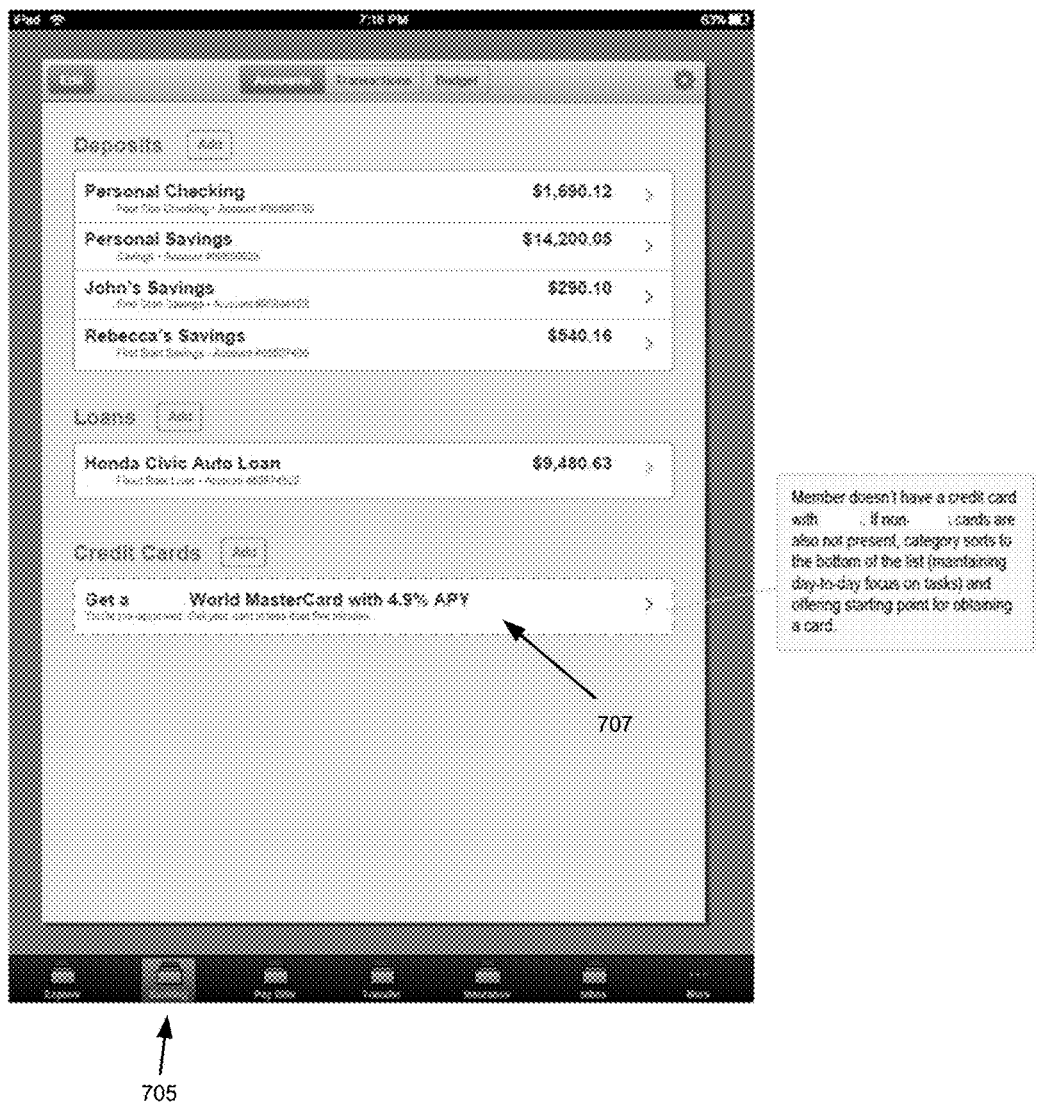

FIG. 7B illustrates a screenshot of an exemplary page of an application when a user taps on a "Banking" tab 705 to view an account summary after the member logs and is successfully authenticated. The member's account summary of deposits and loans are displayed on the screen. If the member does not have a credit card with the financial institution, then a targeted marketing message 707 may be displayed under "Credit Cards" for the member. The account summary may also include accounts from other financial institutions. Typically, the "Credit Cards" category will be sorted to the bottom of the list (maintaining day-to-day focus on tasks) and offering a starting point for obtaining a card.

Figure 7C:
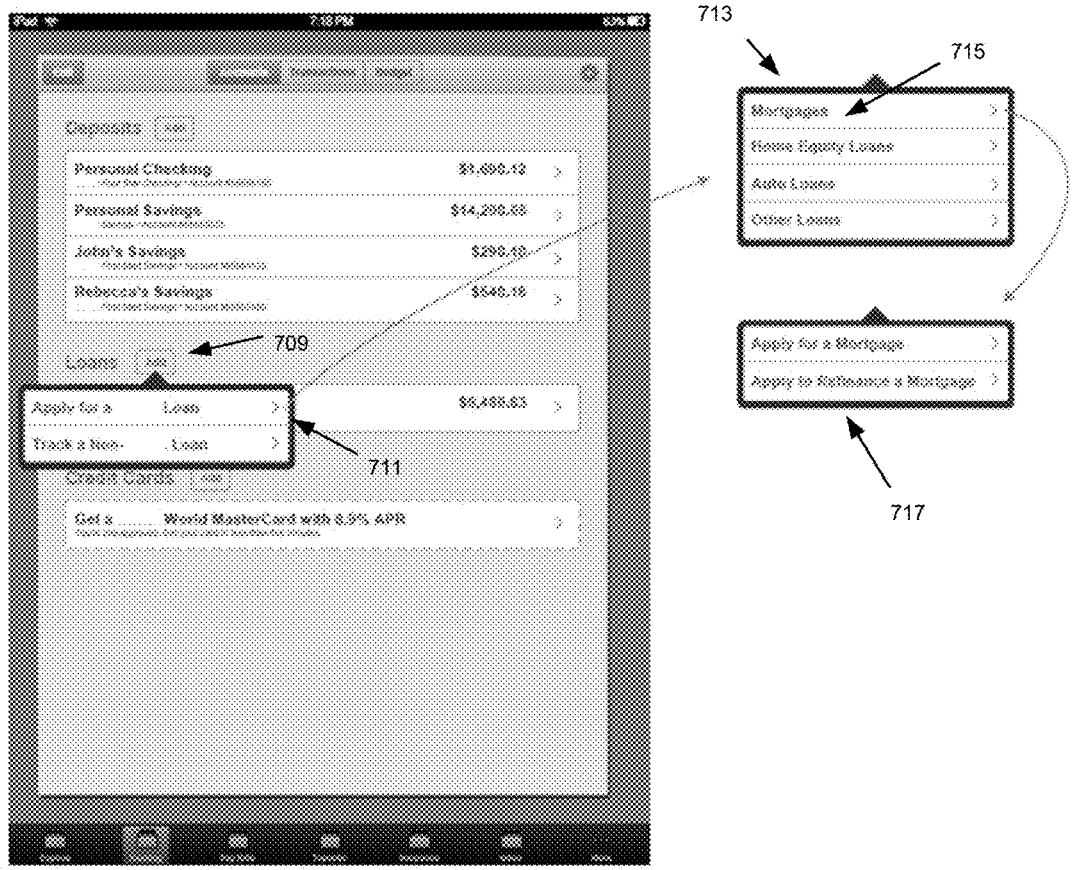

FIG. 7C illustrates a screenshot of an exemplary page of an application when a member selects an "Add" icon 709 associated with loans. Upon selecting the "Add" icon 709, a new drop-down menu 711 is displayed, from which the member can select "Apply for a Loan" item from the menu. The selection brings up a next level new menu 713, from which the member can select one of the loans to apply. When the member selects "Mortgages" from the menu 715, a next level menu 717 is displayed, from which the member can start the mortgage loan application process.

Figure 8A:
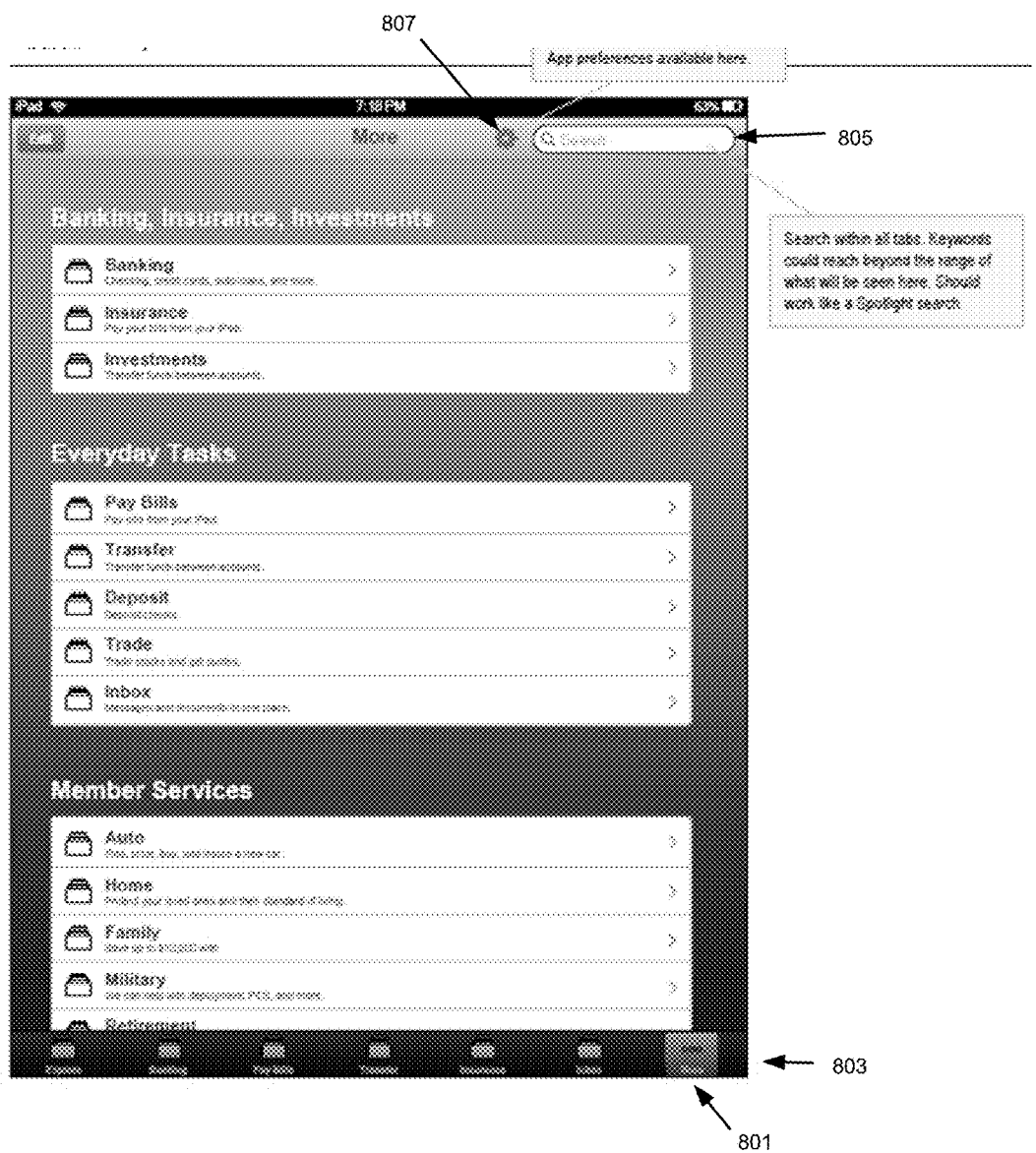
FIGS. 8A-8C are various screenshots of pages of an application illustrating additional features of the application.

FIG. 8A illustrates a screenshot of an exemplary page of an application when a user selects a "More" tab 801 on a tab bar 803. The "More" tab 801 brings out a view of core service sections of the application (e.g., banking, insurance investments), everyday tasks, and member services in the form of menus. A search input box 805, which allows the user to search within all tabs, is displayed on the top portion of the screen. A "Tasks" icon 807 is shown next to the search input box 805, which can be used to modify application preferences by the user.

Figure 8B:
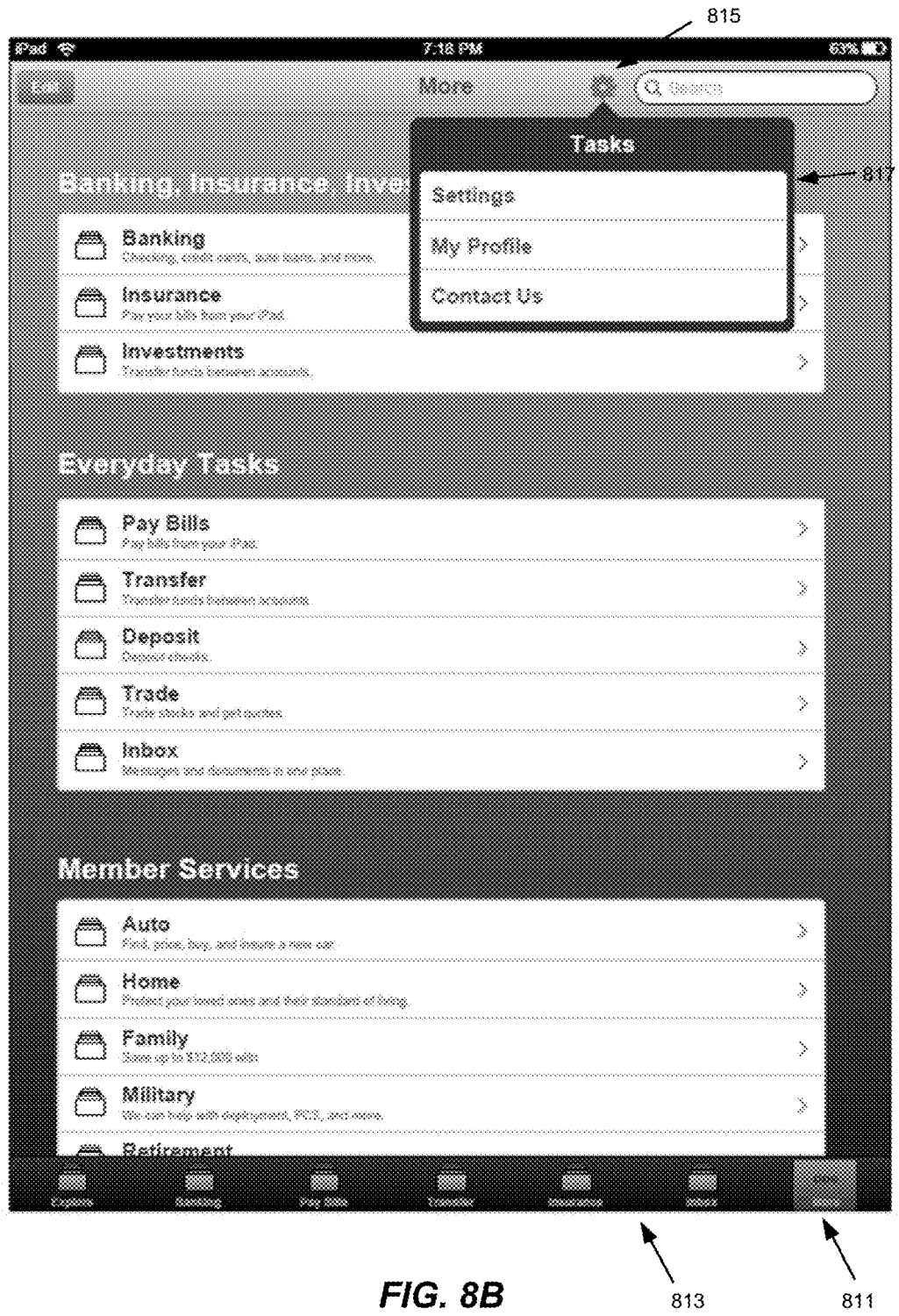

FIG. 8B illustrates a screenshot of an exemplary page of an application when a user selects a "More" tab 811 in a tab bar 813. The page shows three separate menus: 1) Banking, Insurance, Investments; 2) Everyday Tasks; and 3) Member Services. When a "Tasks" icon 815 is selected, a pull down menu 817 is displayed, which allows the user to view or modify Settings, My Profile, and Contact Us.

Figure 8C:
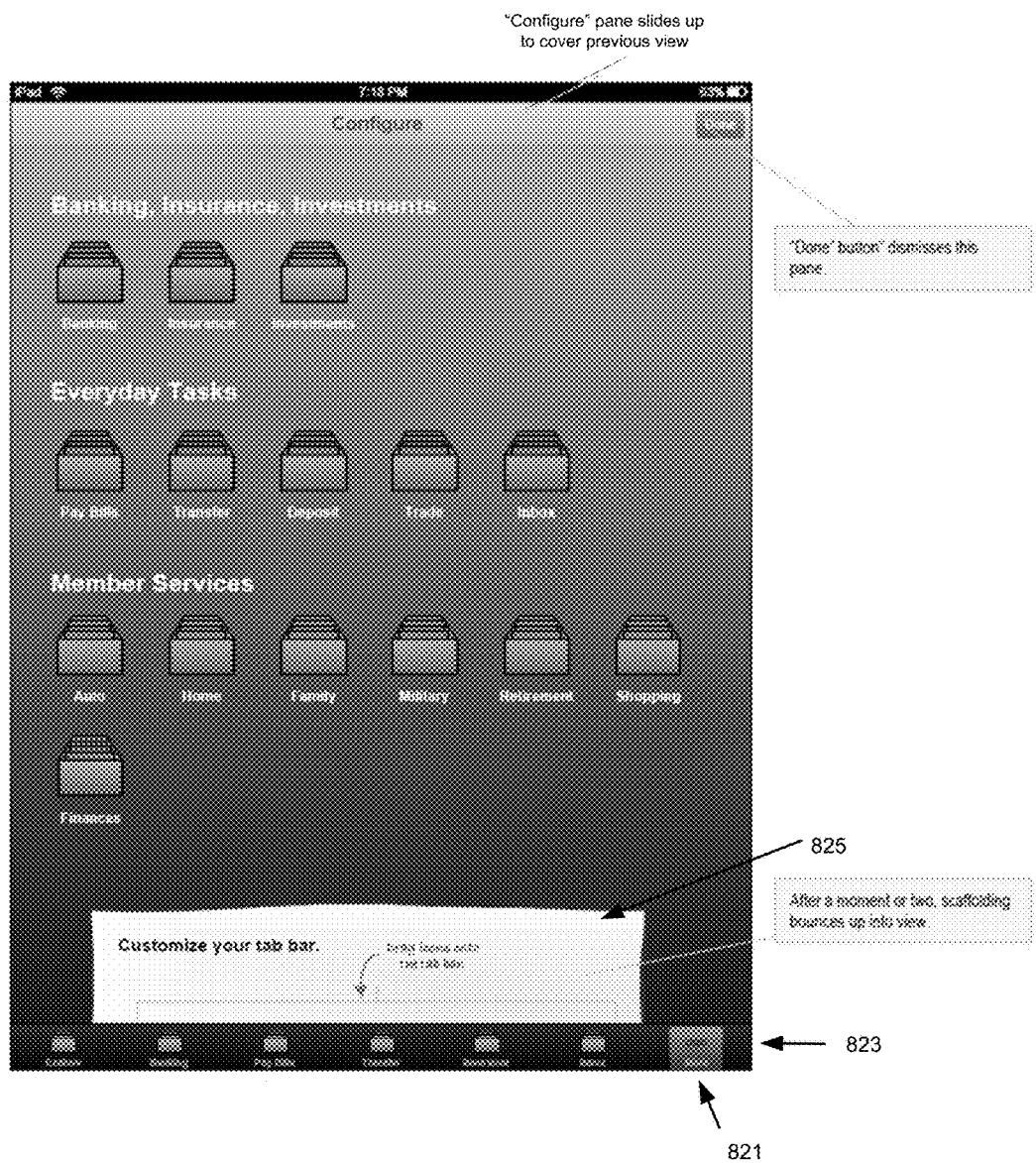

FIG. 8C illustrates a screenshot of an exemplary page of an application when a user selects a "More" tab 821 to configure and customize a tab bar 823. A scaffolding 825 can bounce up into a view, providing an explanation for the user to customize the tab bar by dragging icons into the tab bar 823.

Figure 9:
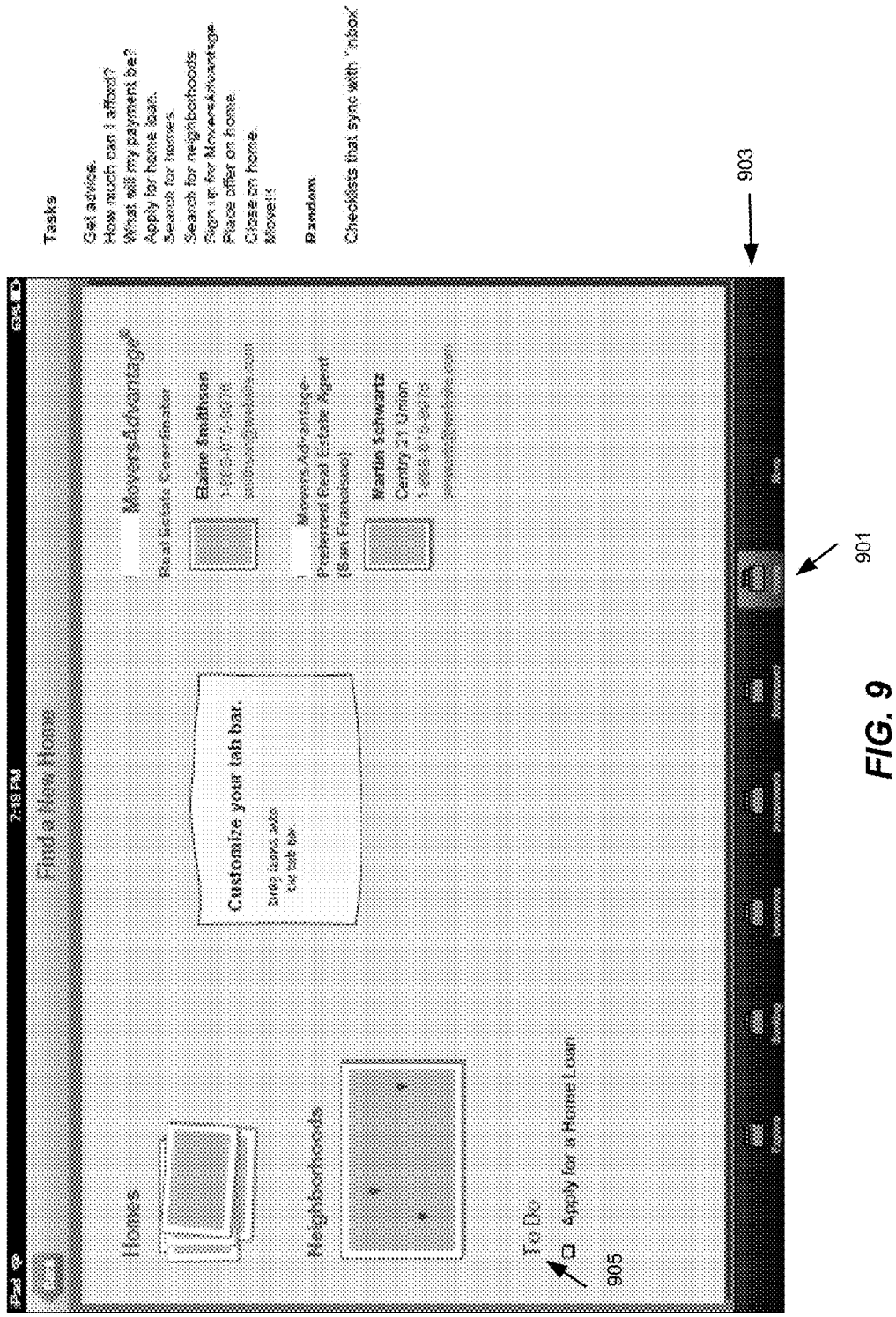
FIG. 9 is a screenshot of a page of an application illustrating "Find a New Home" feature.

FIG. 9 illustrates a schematic view of an exemplary page of an application when a member selects a "Homes" tab 901 under "Member Service" menu shown in FIG. 8C. As shown in FIG. 9, the page includes information related to finding a new home for a member. The services may include getting advice related to finding a home, how much a member can afford, calculating home payment, applying for loan, searching for homes, searching for neighborhoods, or the like. The tab bar shown on the bottom of the figure can be customized by dragging frequently used icons into the tab bar 903. In one embodiment, checklists shown in to do list 905 can be synced with the user's "inbox."

Figure 10A:
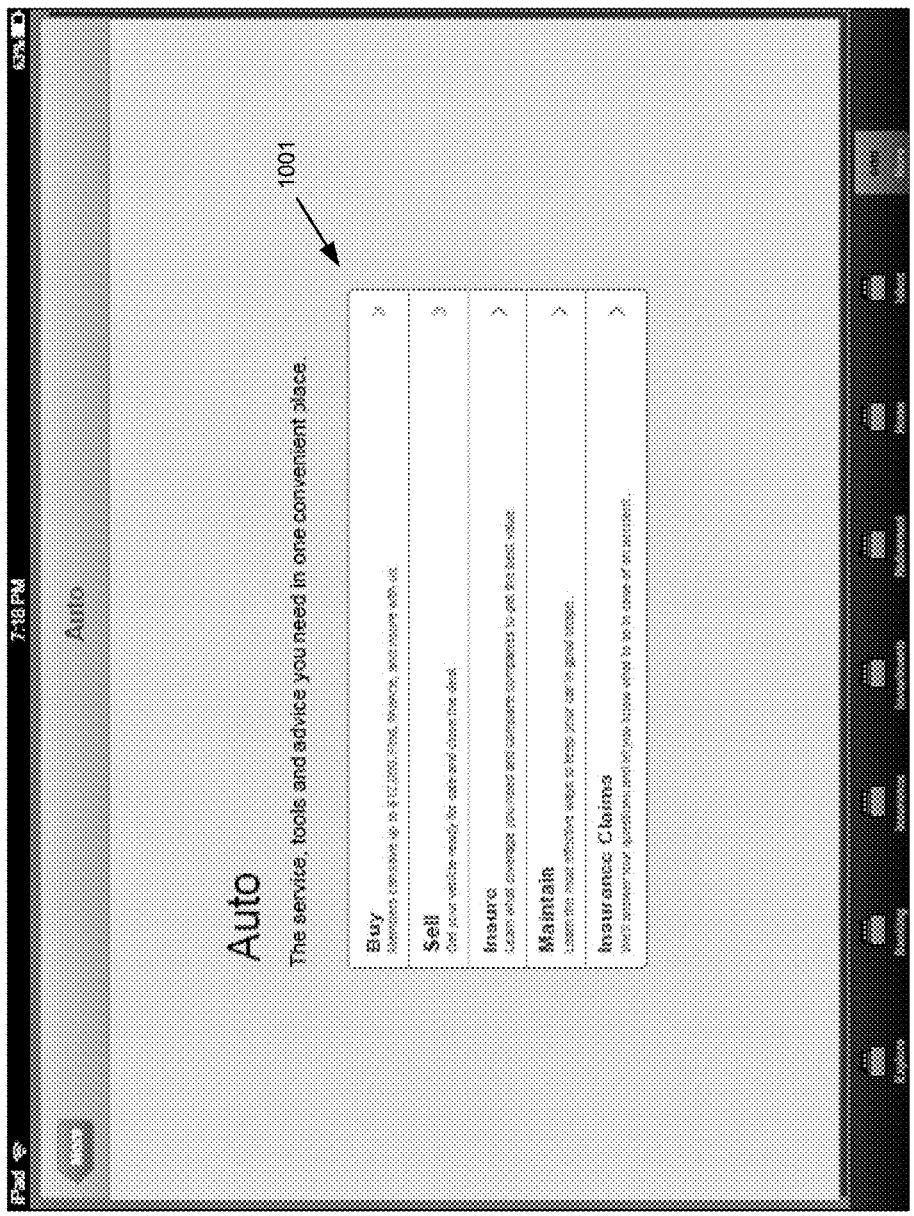
FIGS. 10A-10C are screenshots of pages of an application illustrating various features related to purchasing an automobile.

FIG. 10A illustrates a screenshot of an exemplary page of an application when a member selects "Auto" under "Member Services" menu shown in FIG. 8C. The page provides service, tools, and advice a member need in one place. By selecting an arrow for each item on a menu 1001, a user can obtain information related to buying, selling, insuring, maintaining an automobile, and insurance claims.

Figure 10B:
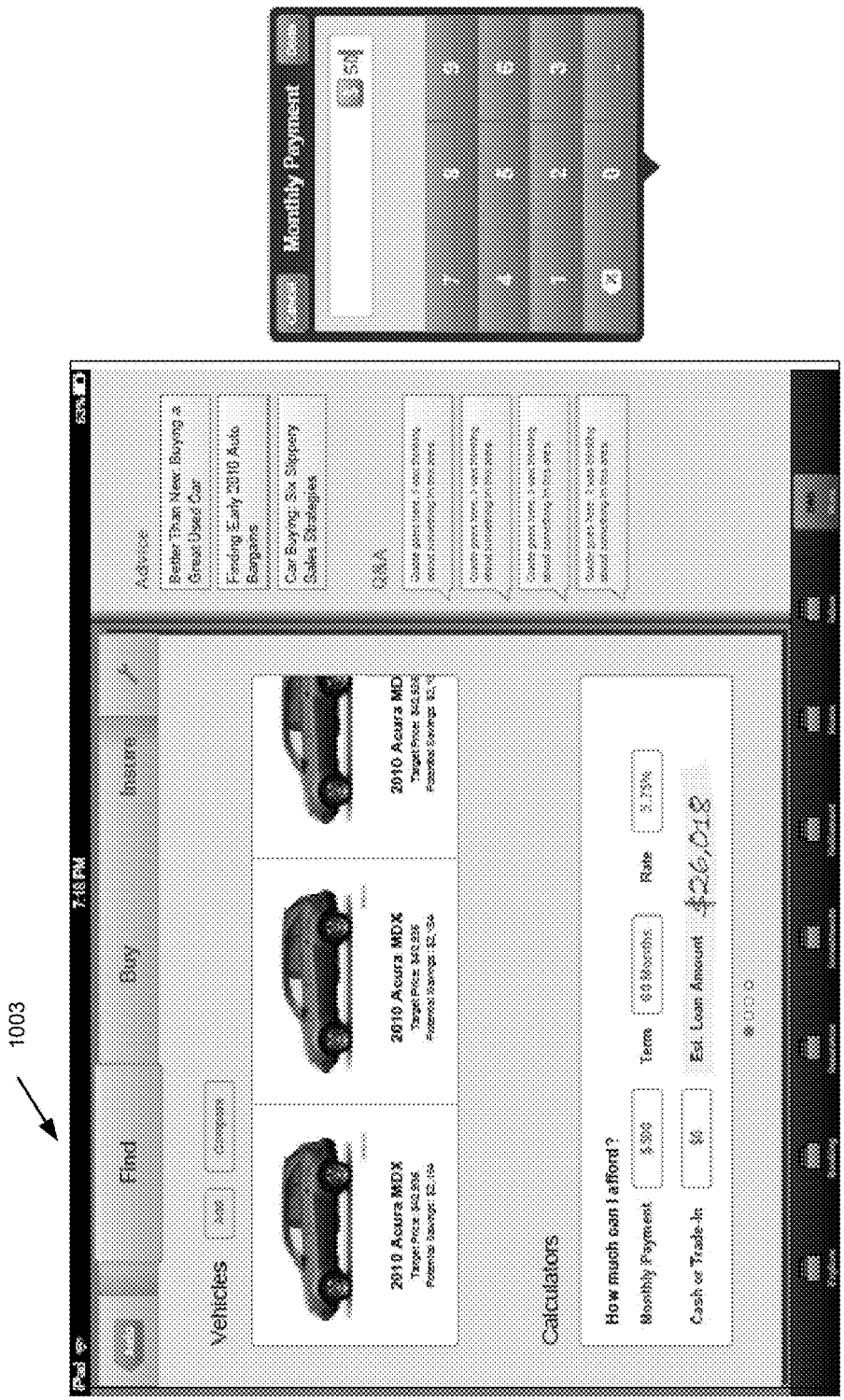

FIG. 10B illustrates a screenshot of an exemplary page of an application when a member selects "Find" button 1003 on the top portion of the pane. Different types of vehicles are displayed, allowing a member to compare payment calculations for purchasing various vehicles. The page also displays a section on the right hand side, providing advice and questions and answers related to purchasing automobiles.

Figure 10C:
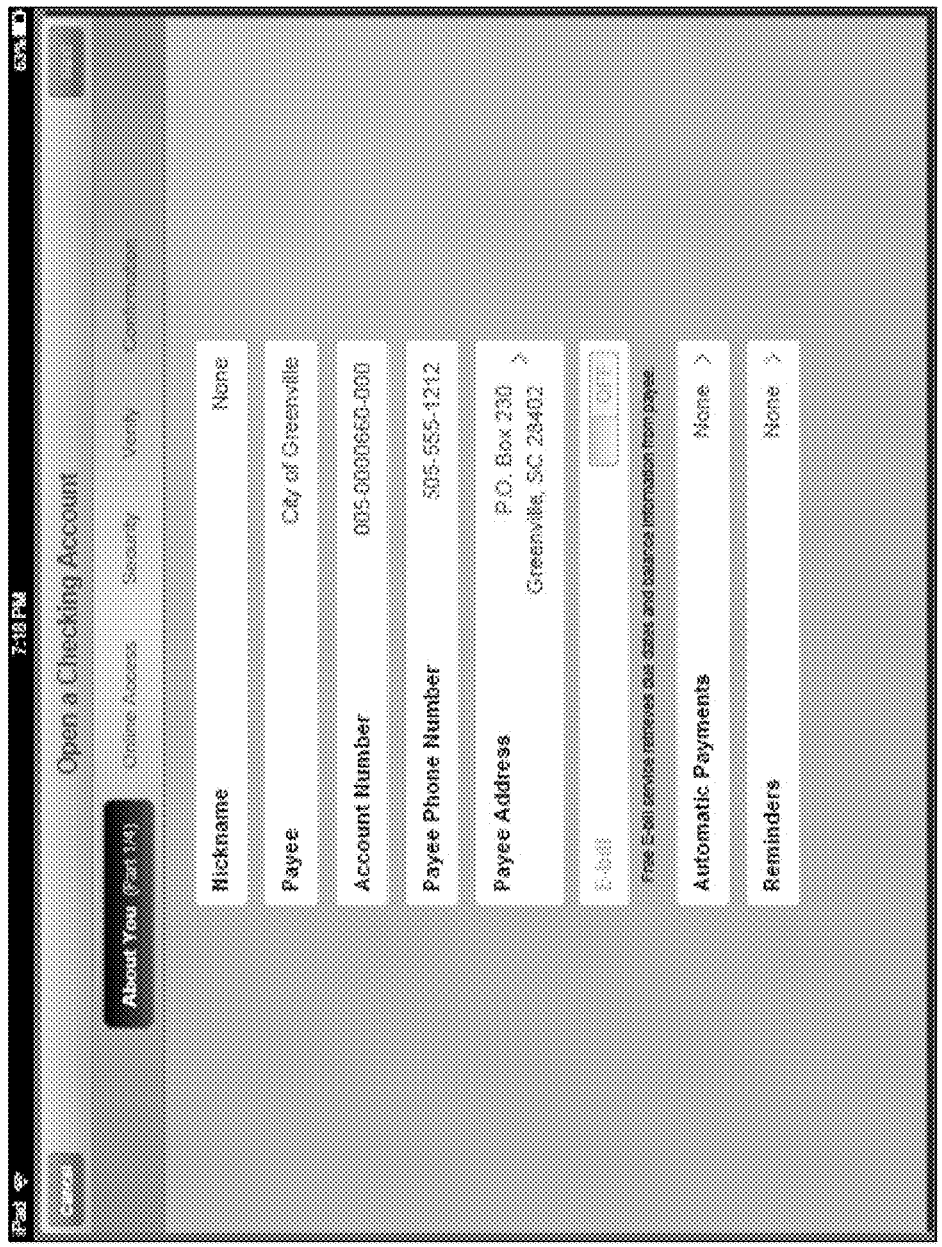

FIG. 10C illustrates a screenshot of an exemplary page of an application. The page shows an account number and related information for paying a payee online. Automatic payments and reminders can be set up on the page.

Figure 11:
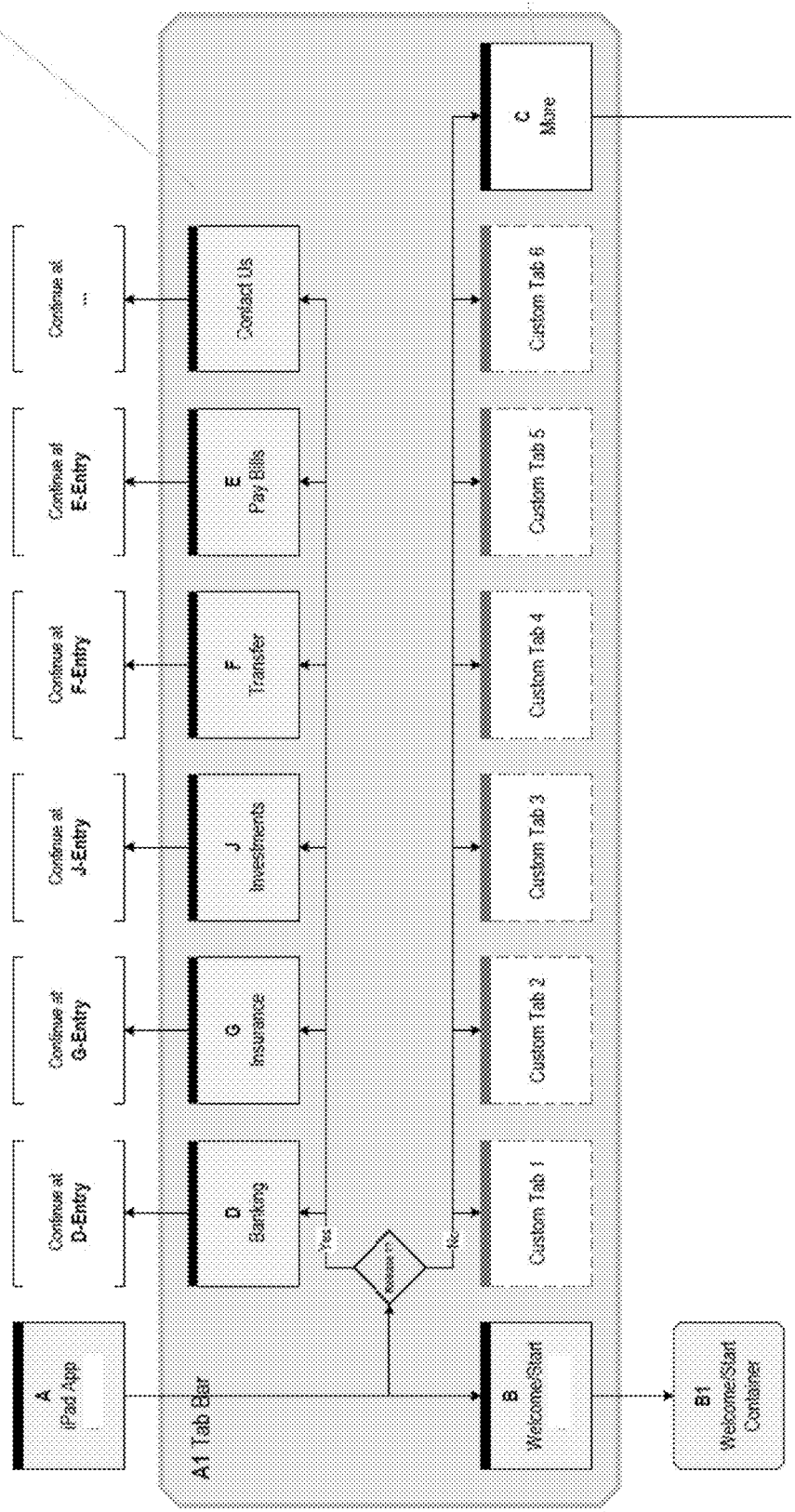
FIG. 11 is a high level schematic diagram illustrating a flowchart for a navigation control item bar at the top tier of the application architecture.

FIG. 11 illustrates a high level schematic diagram showing an exemplary flowchart showing navigation control items at the top tier of the application architecture. The navigation control items at the top tier of the application architecture can include the following: (D) Banking; (G) Insurance; (J) Investments; (F) Transfer; (E) Pay Bills; and Contact Us. These navigation control items can be provided to a user as a default set.

In embodiments of the present invention, once the user has been authenticated successfully as a current customer, the financial institution system can analyze the type and status of accounts held by the customer. This data can be used to automatically personalize the navigation control items for the customer by choosing the best possible default set of navigation control items and their positions in a tab bar as described herein. The personalization/customization of navigation control items are shown as "Custom Tab 1," "Custom Tab 2," "Custom Tab 3," "Custom Tab 4," "Custom Tab 5," and "Custom Tab 6" in FIG. 11. In some embodiments, the customer can further customize the navigation control items according the customer's preferences.

FIG. 6 is a high level block diagram illustrating a computer system including instructions to perform any one or more of the methodologies described herein. A system 600 includes a computer 610 connected to a network 130. The computer 610 includes a processor 620 (also referred to as a data processor), a storage device 622, an output device 624, an input device 626, and a network interface device 628, all connected via a bus 630. The processor 620 represents a central processing unit of any type of architecture, such as a CISC (Complex Instruction Set Computing), RISC (Reduced Instruction Set Computing), VLIW (Very Long Instruction Word), or a hybrid architecture, although any appropriate processor may be used. The processor 620 executes instructions and includes that portion of the computer 610 that controls the operation of the entire computer. Although not depicted in FIG. 6, the processor 620 typically includes a control unit that organizes data and program storage in memory and transfers data and other information between the various parts of the computer 610. The processor 620 receives input data from the input device 626 and the network 130 reads and stores code and data in the storage device 622 and presents data to the output device 624.

Although the computer 610 is shown to contain only a single processor 620 and a single bus 630, the disclosed embodiment applies equally to computers that may have multiple processors and to computers that may have multiple busses with some or all performing different functions in different ways.

The storage device 622 represents one or more mechanisms for storing data. For example, the storage device 622 may include read-only memory (ROM), random access memory (RAM), magnetic disk storage media, optical storage media, flash memory devices, and/or other machine-readable media. In other embodiments, any appropriate type of storage device may be used. Although only one storage device 622 is shown, multiple storage devices and multiple types of storage devices may be present. Further, although the computer 610 is drawn to contain the storage device 622, it may be distributed across other computers, for example on a server.

The storage device 622 includes a controller (not shown in FIG. 6) and data items 634. The controller includes instructions capable of being executed on the processor 620 to carry out the methods described more fully throughout the present specification. In another embodiment, some or all of the functions are carried out via hardware in lieu of a processor-based system. In one embodiment, the controller is a web browser, but in other embodiments the controller may be a database system, a file system, an electronic mail system, a media manager, an image manager, or may include any other functions capable of accessing data items. Of course, the storage device 622 may also contain additional software and data (not shown), which is not necessary to understand the invention.

Although the controller and the data items 634 are shown to be within the storage device 622 in the computer 610, some or all of them may be distributed across other systems, for example on a server and accessed via the network 130.

The output device 624 is that part of the computer 610 that displays output to the user. The output device 624 may be a liquid crystal display (LCD) well-known in the art of computer hardware. But, in other embodiments the output device 624 may be replaced with a gas or plasma-based flat-panel display or a traditional cathode-ray tube (CRT) display. In still other embodiments, any appropriate display device may be used. Although only one output device 624 is shown, in other embodiments any number of output devices of different types, or of the same type, may be present. In an embodiment, the output device 624 displays a user interface.

The input device 626 may be a keyboard, mouse or other pointing device, trackball, touchpad, touch screen, keypad, microphone, voice recognition device, or any other appropriate mechanism for the user to input data to the computer 610 and manipulate the user interface previously discussed. Although only one input device 626 is shown, in another embodiment any number and type of input devices may be present.

The network interface device 628 provides connectivity from the computer 610 to the network 130 through any suitable communications protocol. The network interface device 628 sends and receives data items from the network 130.

The bus 630 may represent one or more busses, e.g., USB (Universal Serial Bus), PCI, ISA (Industry Standard Architecture), X-Bus, EISA (Extended Industry Standard Architecture), or any other appropriate bus and/or bridge (also called a bus controller).

The computer 610 may be implemented using any suitable hardware and/or software, such as a personal computer or other electronic computing device. Portable computers, laptop or notebook computers, PDAs (Personal Digital Assistants), mobile phones, pocket computers, tablets, appliances, telephones, and mainframe computers are examples of other possible configurations of the computer 610. For example, other peripheral devices such as audio adapters or chip programming devices, such as EPROM (Erasable Programmable Read-Only Memory) programming devices may be used in addition to, or in place of, the hardware already depicted.

The network 130 may be any suitable network and may support any appropriate protocol suitable for communication to the computer 610. In an embodiment, the network 130 may support wireless communications. In another embodiment, the network 130 may support hard-wired communications, such as a telephone line or cable. In another embodiment, the network 130 may support the Ethernet IEEE (Institute of Electrical and Electronics Engineers) 802.3x specification. In another embodiment, the network 130 may be the Internet and may support IP (Internet Protocol). In another embodiment, the network 130 may be a local area network (LAN) or a wide area network (WAN). In another embodiment, the network 130 may be a hotspot service provider network. In another embodiment, the network 130 may be an intranet. In another embodiment, the network 130 may be a GPRS (General Packet Radio Service) network. In another embodiment, the network 130 may be any appropriate cellular data network or cell-based radio network technology. In another embodiment, the network 130 may be an IEEE 802.11 wireless network. In still another embodiment, the network 130 may be any suitable network or combination of networks. Although one network 130 is shown, in other embodiments any number of networks (of the same or different types) may be present.

A user mobile computing device 150 can interact with computer 610 through network 130. The user mobile computing device 150 includes a processor 152, a storage device 154, and an input/output device 156. The description related to processor 620 and storage device 622 is applicable to processor 152 and storage device 154. As an example, the user mobile computing device 150 can be a table computer, laptop computer, a smartphone, or the like, operated by a member of a membership organization (e.g., the present assignee). Using the user mobile computing device 150, the member can then interact with computer 610 operated by the present assignee through network 130 in order to access the present assignee's web pages or the like.

The embodiments described herein may be implemented in an operating environment comprising software installed on any programmable device, in hardware, or in a combination of software and hardware. Although embodiments have been described with reference to specific example embodiments, it will be evident that various modifications and changes may be made to these embodiments without departing from the broader spirit and scope of the invention. Accordingly, the specification and drawings are to be regarded in an illustrative rather than a restrictive sense.

It is also understood that the examples and embodiments described herein are for illustrative purposes only and that various modifications or changes in light thereof will be suggested to persons skilled in the art and are to be included within the spirit and purview of this application and scope of the appended claims.

What is claimed is:

1. A method performed by a processor of a mobile computing device for personalizing navigation control of an application, the method comprising:

transmitting, to a financial institution system, at least one identification element of a user to access the financial institution system using the application, the financial institution system authenticating the user at least partially based on the at least one identification element of the user;

receiving, from the financial institution system, information related to personalization of navigation control items associated with a plurality of primary service sections of the application, wherein the information is automatically provided by the financial institution system in response to the financial institution system successfully authenticating the user;

processing the information to automatically provide a personalized arrangement of navigation control items, in which at least one prioritized navigation control item is in a more visually prominent place in the arrangement than at least one non-prioritized navigation control item, based on the at least one prioritized navigation control item being associated with at least one account that is owned by the user, and based on the at least one non-prioritized navigation control item being associated with a type of account that is not owned by the user; and displaying, on a page of the application, the personalized arrangement of navigation control items for the user for navigating the plurality of primary service sections of the application, the displaying including automatically arranging the navigation control items for display according to the personalized arrangement.

2. The method of claim 1, further comprising receiving, from the financial institution system, confirmation of user authentication based on the at least one identification element of the user.

3. The method of claim 1 wherein:
the navigation control items are tabs; and
the personalized arrangement of the tabs is in a tab bar in which at least one prioritized tab is left of at least one non-prioritized tab in the tab bar.

4. The method of claim 1 wherein the primary service sections include two or more of banking, insurance, investments, pay bills, and transfer/deposit.

5. The method of claim 1 wherein the business rules include prioritizing the navigation control items according to the user's business relationship with each of the primary service sections and placing the navigation control items with higher priority values at visually prominent places in a tab bar on the page of the application.

6. The method of claim 5 wherein the business rules further include prioritizing the navigation control items based on the user's utilization frequency of each of the primary service sections.

7. The method of claim 1 wherein the business rules further include prioritizing the navigation control items based on the user's peer group's utilization frequency of each of the primary service sections.

8. The method of claim 1, further comprising storing the information related to the personalized navigation control items in the memory of the mobile computing device.

9. The method of claim 1, further comprising receiving, from the user, the user's customization of the personalized navigation control items on the page of the application.

10. A method of providing personalized navigation control of an application by a financial institution system, the method comprising:
receiving, at the financial institution system via the application on a mobile computing device, at least one identification element associated with a user, the financial institution system authenticating the user at least partially based on the at least one identification element of the user;
authenticating the user by comparing the at least one identification element with the user's credentials stored in a database of the financial institution system;
in response to successfully authenticating the user, analyzing, using business rules and a processor, user data including the user's business relationship with respect to each of primary service sections of the financial institution system;
determining, using the processor, personalization of navigation control items for navigating the primary service sections on a page of the application, wherein an arrangement of the navigation control items is automatically personalized, according to an analysis of the user data using the business rules, to provide a personalized arrangement of navigation control items, in which at least one prioritized navigation control item is in a more visually prominent place in the arrangement than at least one non-prioritized navigation control item, based on the at least one prioritized navigation control item being associated with at least one account that is owned by the user, and based on the at least one non-prioritized navigation control item being associated with a type of account that is not owned by the user; and
transmitting information related to the personalization of the navigation control items to the mobile computing device, the mobile computing device processing the information to provide the personalized arrangement of navigation control items for display to the user, wherein the arrangement automatically prioritizes the at least one of the prioritized navigation control items that is associated with the at least one account that is owned by the user.

11. The method of claim 10, further comprising transmitting confirmation of authentication of the user to the mobile computing device.

12. The method of claim 10 wherein the business rules include prioritizing the navigation control items according to the user's business relationship with each of the primary business sections and placing the navigation control items with higher priority values at visually prominent places on the page of the application.

13. The method of claim 12 wherein the business rules further include prioritizing the navigation control items based on the user's utilization frequency of each of the primary service sections.

14. The method of claim 12 wherein the business rules further include prioritizing the navigation control items based on the user's peer group's utilization frequency of each of the primary service sections.

15. The method of claim 10, further comprising storing the information related to personalization of the navigation control items in the memory of the financial institution system.

16. The method of claim 10, further comprising:
updating the business rules;
analyzing the user data using the updated business and the processor; and determining, using the processor, updated personalization of the navigation control items based on an analysis of the user data; and
transmitting information related to the updated personalization of the navigation control items to the mobile computing device.

17. The method of claim 10, further comprising:
receiving updated user data;
analyzing the updated user data using the business rules and the processor; and determining, using the processor, updated personalization of the navigation control items based on an analysis of the updated user data; and
transmitting information related to the updated personalization of the navigation control items to the mobile computing device.

18. A system for providing personalized navigation control of an application on a mobile computing device, the system comprising:
a processor; and
a computer-readable medium coupled to the processor and storing a plurality of instructions, which, when executed, cause the processor to provide the personalized navigation control of the application, the plurality of instructions comprising:
instructions that cause the processor to transmit, to the financial institution system, at least one identification element of a user, the financial institution system authenticating the user at least partially based on the at least one identification element of the user;
instructions that cause the processor to receive, from the financial institution system, information related to personalization of navigation control items associated with a plurality of primary service sections of the application, wherein the information is automatically provided by the financial institution system in response to the financial institution system successfully authenticating the user;

instructions to process the information to automatically provide a personalized arrangement of navigation control items, in which at least one prioritized navigation control item is in a more visually prominent place in the arrangement than at least one non-prioritized navigation control item, based on the at least one prioritized navigation control item being associated with at least one account that is owned by the user, and based on the at least one non-prioritized navigation control item being associated with a type of account that is not owned by the user; and instructions that cause the processor to display, on a page of the mobile computing device, the personalized arrangement of navigation control items for the user for navigating the plurality of primary service sections of the application, the displaying including automatically arranging the navigation control items for display according to the personalized arrangement.

19. The system of claim 18 wherein the business rules include prioritizing the navigation control items according to the user's business relationship with each of the primary service sections and placing the navigation control items with higher priority values at visually prominent places on the page of the application.

20. The system of claim 18 wherein the business rules further include prioritizing the navigation control items based on the user's utilization frequency of each of the primary service sections.

* * * * *